United States Patent
Zhu

(10) Patent No.: US 10,836,273 B2
(45) Date of Patent: Nov. 17, 2020

(54) ADAPTIVE ELECTRIC VEHICLE CHARGING BASED ON GRID MONITORING

(71) Applicant: HUMMINGBIRDEV, Livermore, CA (US)

(72) Inventor: Zhengmao Zhu, Fremont, CA (US)

(73) Assignee: HUMMINGBIRDEV, Livermore, CA (US)

(*) Notice: Subject to any disclaimer, the term of this patent is extended or adjusted under 35 U.S.C. 154(b) by 94 days.

(21) Appl. No.: 16/016,269

(22) Filed: Jun. 22, 2018

(65) Prior Publication Data
US 2019/0389315 A1    Dec. 26, 2019

(51) Int. Cl.
*B60L 53/65* (2019.01)
*H02J 7/00* (2006.01)
*B60L 55/00* (2019.01)

(52) U.S. Cl.
CPC .............. *B60L 53/65* (2019.02); *B60L 55/00* (2019.02); *H02J 7/0071* (2020.01); *H02J 7/0077* (2013.01)

(58) Field of Classification Search
CPC ....................................................... B60L 53/65
USPC ................................................ 320/104, 109
See application file for complete search history.

(56) References Cited

U.S. PATENT DOCUMENTS

| | | | |
|---|---|---|---|
| 5,099,186 A | 3/1992 | Rippel et al. | |
| 8,432,126 B2 | 4/2013 | Hasan et al. | |
| 2010/0219797 A1 | 9/2010 | Veselic et al. | |
| 2011/0215743 A1 | 9/2011 | Fukatsu | |
| 2012/0062176 A1 | 3/2012 | Hasan | |
| 2013/0066494 A1 | 3/2013 | Kamijo | |
| 2013/0141040 A1 | 6/2013 | DeBoer et al. | |
| 2013/0147404 A1 | 6/2013 | Kim | |
| 2015/0069936 A1 | 3/2015 | Jang et al. | |
| 2015/0231978 A1 | 8/2015 | Danner | |
| 2015/0298574 A1 | 10/2015 | Bramson | |
| 2015/0314694 A1 | 11/2015 | Alakula et al. | |
| 2016/0190961 A1 | 6/2016 | Holveck | |

(Continued)

OTHER PUBLICATIONS

Zhu, Office Action, U.S. Appl. No. 15/717,686, dated Jan. 24, 2019, 6 pgs.

(Continued)

*Primary Examiner* — Edward Tso
*Assistant Examiner* — Ahmed H Omar
(74) *Attorney, Agent, or Firm* — Morgan, Lewis & Bockius LLP

(57) ABSTRACT

At an electronic device that is coupled to a set of circuits configured to supply electricity to respective on-board charging systems of one or more electric vehicles: detecting activation of a first electric vehicle charging connection; in response to detecting the activation of the first electric vehicle charging connection, obtaining a first communication signal through the first electric vehicle charging connection; decoding the first communication signal to extract a respective vehicle identifier corresponding to an on-board charging system of a first electric vehicle that is connected to the set of circuits through the first electric charging connection; configuring a first charging mode for the on-board charging system of the first electric vehicle in accordance with the respective vehicle identifier; and enabling charging of the first electric vehicle through the first electric vehicle charging connection in accordance with the first charging mode.

17 Claims, 11 Drawing Sheets

(56) References Cited

U.S. PATENT DOCUMENTS

2016/0318503 A1   11/2016  Zhou
2018/0162358 A1    6/2018  Youn et al.
2018/0339601 A1* 11/2018  Kruszelnicki ....... B60L 11/1833
2019/0275893 A1*  9/2019  Sham .................... B60L 53/305
2019/0291589 A1*  9/2019  Erb .................... G06Q 20/4014

OTHER PUBLICATIONS

Zhu, Office Action, U.S. Appl. No. 15/717,679, dated Jun. 17, 2019, 16 pgs.
Zhu, International Search Report/Written Opinion, PCT/US2018/053075, dated Jan. 28, 2019, 7 pgs.
Zhu, International Preliminary Report on Patentability, PCT/US2018/053075, dated Mar. 31, 2020, 5 pgs.

\* cited by examiner

ADAPTIVE ELECTRIC VEHICLE CHARGING BASED ON GRID MONITORING

RELATED APPLICATION

This application relates to U.S. patent application Ser. No. 16/016,263, filed Jun. 22, 2018, entitled "ADAPTIVE ELECTRIC VEHICLE CHARGING BASED ON GRID MONITORING," which is incorporated by reference herein in its entirety.

TECHNICAL FIELD

The disclosed embodiments relate generally to electric vehicle charging methods and systems, including but not limited to on-board charging systems for electric vehicles, electric vehicle charging stations, and electric vehicle charging facility management methods and systems.

BACKGROUND

Electric vehicles are becoming increasingly prevalent, accounting for a growing share of vehicles in the market. However, the availability of electric vehicle charging stations (or the lack thereof) and the limited speeds at which electric vehicles can be charged present barriers to more widespread adoption of electric vehicles.

Generally, two types of electric vehicle charging stations (sometimes called conductive charging systems or electric vehicle supply equipment (EVSE)) are used: alternating current-based charging stations (AC EVSE), and direct current-based charging stations (DC EVSE). The use of AC EVSE typically offers more limited charging capabilities, such as slower charging speeds, due to the need for an on-board system installed in or on the electric vehicle to convert AC power from an electrical grid into the DC power needed for charging the DC energy storage units of the vehicle. The use of DC EVSE typically offers greater charging capabilities, such as higher power transmission and faster charging speeds, than AC EVSE. Moreover, directly providing DC power to the vehicle, rather than AC power, eliminates the need for the on-board AC-DC conversion system. However, the cost of implementing DC EVSE is significantly higher than that of AC EVSE, a factor that limits the availability of DC EVSE.

State of the art high power charging stations require expensive infrastructure upgrades in order to meet the current demand. These upgrades typically include large transformers, higher amperage power lines, high amperage circuit breakers, and so on. In addition, in order to ensure that all installed high power charging stations function as expected, a large amount of grid resources must be reserved for the charging facility that provides the charging stations. The large amount of reserved grid resources often goes underutilized, resulting in waste and inefficiencies in energy management by the electricity providers. In addition, the un-recouped economic costs for maintaining the grid reserves for a charging facility prohibits the wide infrastructure development needed to make electric vehicles a more prevalent and useful mode of transportation today.

Furthermore, electric vehicle charging facilities typically use a one-size-fits-all approach in charging electric vehicles. The charging of electric vehicles is not customizable or coordinated in any manner at a charging facility, which leads to inefficiencies in power usage, time usage, and poor economics and user experience. The charging facility requires specialized equipment that offers a human-machine interface for receiving charging authorizations and a robust security system to ensure privacy of customer data, which makes the cost of building a charging facility prohibitively high in many cases.

Accordingly, there is a need for lower cost, more efficient, and more user-friendly charging facilities and charging stations to help with quicker and wider adoption of electric vehicles and protecting the environment.

SUMMARY

In some embodiments, a method of controlling an electric vehicle charging station, comprises: at an electronic device having one or more processors and memory, wherein: the electronic device is coupled to a main input of an electricity demand center on an electric grid, and the electricity demand center includes a first set of circuits configured to supply electricity to a first set of electrical devices and a second set of circuits configured to supply electricity to respective on-board charging systems of one or more electric vehicles: activating load monitoring for the electricity demand center on the electric grid; determining an electricity consumption cap for a current electricity consumption cycle at the electricity demand center; during the current electricity consumption cycle, detecting activation of a first electric vehicle charging connection in the second set of circuits; and in response to detecting activation of the first electric vehicle charging connection in the second set of circuits, enforcing an output power cap for the second set of circuits, including dynamically adjusting a current output power of the first electric vehicle charging connection in accordance with a difference between the electricity consumption cap for the current electricity consumption cycle and a current load on the first set of circuits of the electricity demand center.

In some embodiments, an electronic device for controlling an electric vehicle charging station is coupled to a main input of an electricity demand center on an electric grid, the electricity demand center includes a first set of circuits configured to supply electricity to a first set of electrical devices and a second set of circuits configured to supply electricity to respective on-board charging systems of one or more electric vehicles, and the electronic device includes one or more processors and memory storing instructions, wherein the instructions, when executed by the one or more processors, cause the processors to perform operations comprising: activating load monitoring for the electricity demand center on the electric grid; determining an electricity consumption cap for a current electricity consumption cycle at the electricity demand center; during the current electricity consumption cycle, detecting activation of a first electric vehicle charging connection in the second set of circuits; and in response to detecting activation of the first electric vehicle charging connection in the second set of circuits, enforcing an output power cap for the second set of circuits, including dynamically adjusting a current output power of the first electric vehicle charging connection in accordance with a difference between the electricity consumption cap for the current electricity consumption cycle and a current load on the first set of circuits of the electricity demand center.

In some embodiments, an electronic device for controlling an electric vehicle charging station is coupled to a main input of an electricity demand center on an electric grid, the electricity demand center includes a first set of circuits configured to supply electricity to a first set of electrical devices and a second set of circuits configured to supply electricity to respective on-board charging systems of one or more electric vehicles, the electronic device is configured to communicate with the respective on-board charging systems of the one or more electric vehicles to receive respective unique identifiers for the respective on-board charging systems of the one or more electric vehicles and provide respective charging instructions to the on-board charging systems of the one or more electric vehicles, and the electronic device includes: one or more load sensors for sensing real-time electricity load at the input main of the electricity demand center; and a charging control unit with one or more processors and memory storing instructions, wherein the instructions, when executed by the one or more processors, cause the processors to perform operations comprising: activating load monitoring for the electricity demand center on the electric grid; determining an electricity consumption cap for a current electricity consumption cycle at the electricity demand center; during the current electricity consumption cycle, detecting activation of a first electric vehicle charging connection in the second set of circuits; and in response to detecting activation of the first electric vehicle charging connection in the second set of circuits, enforcing an output power cap for the second set of circuits, including dynamically adjusting, via one or more first charging instructions sent from the charging control unit to the respective on-board charging system of the first electric vehicle, a current output power of the first electric vehicle charging connection in accordance with a difference between the electricity consumption cap for the current electricity consumption cycle and a current load on the first set of circuits of the electricity demand center.

In some embodiments, a method of controlling an electric vehicle charging station comprises: at an electronic device having one or more processors and memory, wherein the electronic device is coupled to a set of circuits configured to supply electricity to respective on-board charging systems of one or more electric vehicles: detecting activation of a first electric vehicle charging connection in the set of circuits; in response to detecting the activation of the first electric vehicle charging connection in the set of circuits, obtaining a first communication signal through the first electric vehicle charging connection; decoding the first communication signal to extract a respective vehicle identifier corresponding to an on-board charging system of a first electric vehicle that is connected to the set of circuits through the first electric charging connection; configuring a first charging mode for the on-board charging system of the first electric vehicle in accordance with the respective vehicle identifier extracted from the communication signal obtained through the first electric vehicle connection; and enabling charging of the first electric vehicle through the first electric vehicle charging connection in accordance with the first charging mode that is configured for the on-board charging system of the first electric vehicle in accordance with the respective vehicle identifier.

In some embodiments, an electronic device for controlling an electric vehicle charging station is coupled to a set of circuits configured to supply electricity to respective on-board charging systems of one or more electric vehicles, the electronic device includes one or more processors and memory storing instructions, the instructions, when executed by the one or more processors, cause the processors to perform operations comprising: detecting activation of a first electric vehicle charging connection in the set of circuits; in response to detecting the activation of the first electric vehicle charging connection in the set of circuits, obtaining a first communication signal through the first electric vehicle charging connection; decoding the first communication signal to extract a respective vehicle identifier corresponding to an on-board charging system of a first electric vehicle that is connected to the set of circuits through the first electric charging connection; configuring a first charging mode for the on-board charging system of the first electric vehicle in accordance with the respective vehicle identifier extracted from the communication signal obtained through the first electric vehicle connection; and enabling charging of the first electric vehicle through the first electric vehicle charging connection in accordance with the first charging mode that is configured for the on-board charging system of the first electric vehicle in accordance with the respective vehicle identifier.

In some embodiments, an electronic device for controlling an electric vehicle charging station is coupled to a main input of an electricity demand center on an electric grid, the electricity demand center includes a first set of circuits configured to supply electricity to a first set of electrical devices and a second set of circuits configured to supply electricity to respective on-board charging systems of one or more electric vehicles, the electronic device is configured to communicate with the respective on-board charging systems of the one or more electric vehicles to receive respective unique identifiers for the respective on-board charging systems of the one or more electric vehicles and provide respective charging instructions to the on-board charging systems of the one or more electric vehicles, and the electronic device is configured to communicate with a server via a first communication channel, the electronic device includes: one or more load sensors for sensing real-time electricity load at the input main of the electricity demand center; and a charging control unit with one or more processors and memory storing instructions, wherein the instructions, when executed by the one or more processors, cause the processors to perform operations comprising: detecting activation of a first electric vehicle charging connection in the second set of circuits; in response to detecting the activation of the first electric vehicle charging connection in the second set of circuits, obtaining a first communication signal through the first electric vehicle charging connection; decoding the first communication signal to extract a respective vehicle identifier corresponding to an on-board charging system of a first electric vehicle that is connected to the second set of circuits through the first electric charging connection; configuring a first charging mode for the on-board charging system of the first electric vehicle in accordance with the respective vehicle identifier extracted from the communication signal obtained through the first electric vehicle connection; and enabling charging of the first electric vehicle through the first electric vehicle charging connection in accordance with the first charging mode that is configured for the on-board charging system of the first electric vehicle in accordance with the respective vehicle identifier.

In some embodiments, non-transitory computer readable medium storing instructions, which, when executed by one or more processors of a charging facility management device, causes the charging facility management device to perform operations described herein in various embodiments.

The above deficiencies and other problems associated with electric vehicle charging systems, charging stations, and charging facilities are reduced or eliminated by the systems and methods disclosed herein. Various embodiments of systems, methods, devices, and non-transitory computer-readable storage media within the scope of the appended claims each have several aspects, no single one of which is solely responsible for the attributes describe herein. Without limiting the scope of the appended claims, after considering this disclosure, and particularly after considering the section entitled "Detailed Description," one will understand how the aspects of various embodiments are used to provide improved electric vehicle charging and improved charging facility management.

BRIEF DESCRIPTION OF THE DRAWINGS

In order that the present disclosure can be understood in greater detail, a more particular description is made in reference to the features of various embodiments, some of which are illustrated in the appended drawings. The appended drawings, however, merely illustrate the more pertinent features of the present disclosure and are therefore not to be considered limiting, for the description may admit to other effective features.

Figure 1:
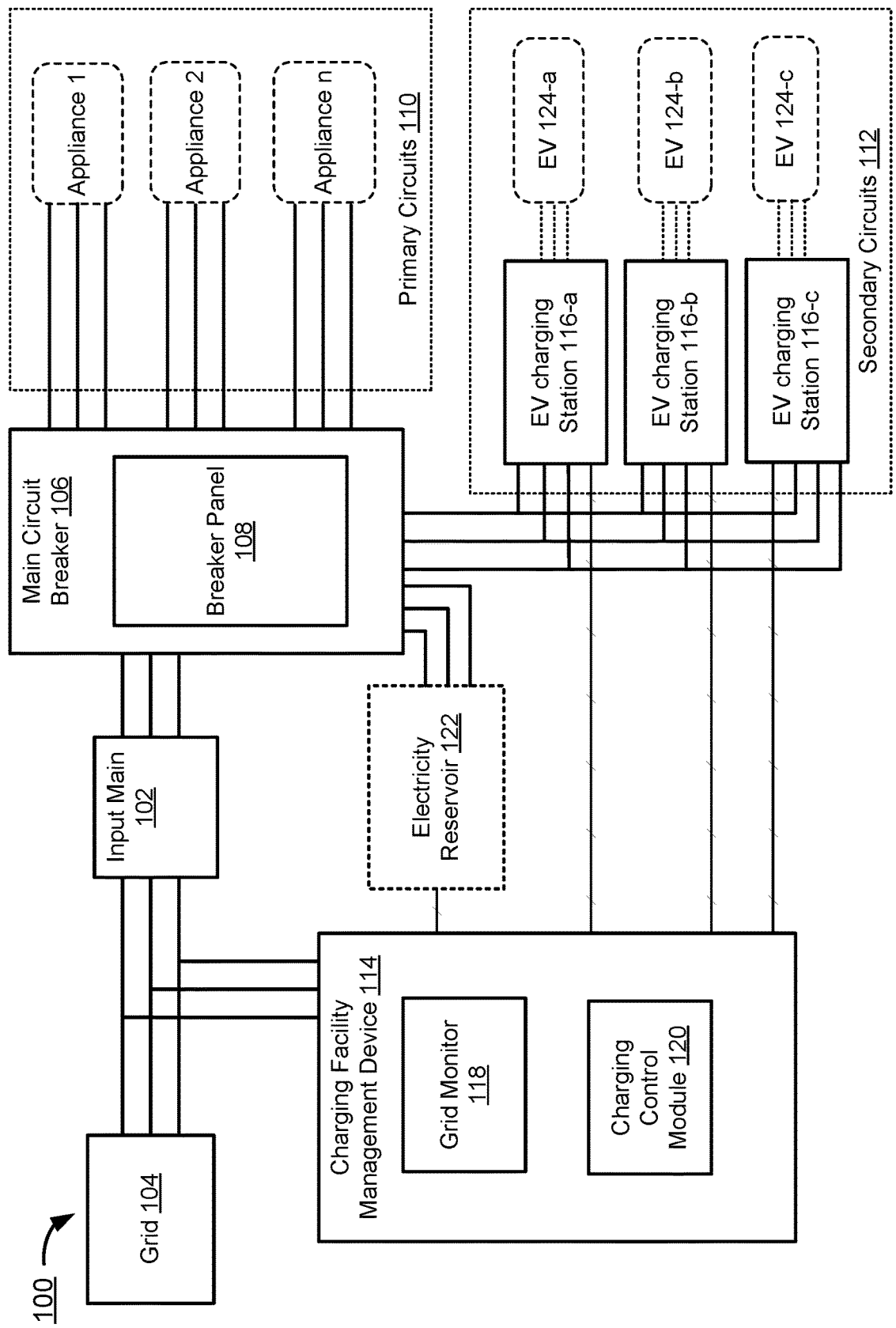
FIG. 1 is a schematic diagram illustrating an example operating environment of an electricity demand center with an electric vehicle charging facility in accordance with some embodiments.

In accordance with common practice, the various features illustrated in the drawings may not be drawn to scale. Accordingly, the dimensions of the various features may be arbitrarily expanded or reduced for clarity. In addition, some of the drawings may not depict all the components of a given system, method or device. Finally, like reference numerals may be used to denote like features throughout the specification and figures.

DETAILED DESCRIPTION

Reference will now be made in detail to embodiments, examples of which are illustrated in the accompanying drawings. In the following detailed description, numerous non-limiting specific details are set forth to assist in understanding the subject matter presented herein. It will be apparent, however, to one of ordinary skill in the art that various alternatives may be used without departing from the scope of the claims, and that the subject matter may be practiced without these specific details. In other instances, well-known methods, procedures, components, circuits, and systems have not been described in detail so as not to unnecessarily obscure aspects of the embodiments. In addition, features described with respect to particular embodiments, may be combined with features described with respect to other embodiments without limitation, unless explicitly stated otherwise.

It will also be understood that, although the terms "first," "second," etc. may be used herein to describe various elements, these elements should not be limited by these terms. These terms are only used to distinguish one element from another. For example, a first controller could be termed a second controller, and, similarly, a second controller could be termed a first controller, without changing the meaning of the description, so long as all occurrences of the "first controller" are renamed consistently and all occurrences of the second controller are renamed consistently. The first controller and the second controller are both controller, but they are not the same controller, unless the context clearly indicates otherwise.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the phrase "at least one of A, B and C" is to be construed to require one or more of the listed items, and this phase reads on a single instance of A alone, a single instance of B alone, or a single instance of C alone, while also encompassing combinations of the listed items such as "one or more of A and one or more of B without any of C," and the like.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

As set forth in the background section, the state of the art electric vehicle charging facilities are expensive to build and maintain due to the special requirements on equipment and infrastructure support. For example, high power charging stations require large transformers, high amperage power lines, high amperage circuit breakers, as well as other specialized safety mechanisms to be installed based on anticipated charging demands. Various types of charging equipment (e.g., electric connectors and information exchange mechanisms) are needed to accommodate different types of electric vehicles and different types of on-board charging systems (e.g., AC charging, DC charging, and other types of proprietary charging styles). Each charging station also needs specially designed security and user interface equipment (e.g., display, input system, payment system, encryption system, etc.) to receive payment information and user authorizations.

In addition to the fixed cost of purchasing and installing the charging station equipment, the daily operational cost of a charging facility is also very high. For example, in order to keep up with variations of electricity demand over time (e.g., day to day, month to month, etc.), the utility companies maintain electricity reserves for each large electricity demand center, and typically charge a fee for such reserves. Frequently, the utility companies charge for this reserve in the form of a "line charge" which is calculated based on the maximum electricity usage level that has occurred during an electricity consumption cycle (e.g., weekly, monthly, quarterly, or annually). The greater the peak electricity consumption for an electricity demand center is, the greater the line charge for the electric demand center is. An electricity vehicle charging facility incurs this "line charge" for the electricity reserve that is maintained on its behalf by the utility company, even if the charging facility does not dispense electricity anywhere near the peak level for a majority of the time during an electricity consumption cycle for which the "line charge" is exacted. This extra "line charge" makes many facility managers reluctant to build and operate electric vehicle charging facilities on their properties.

Presently, large electricity demand centers, such as industrial facilities, shopping malls, office buildings, hospitals, stadiums, storage and distribution centers, large chain stores, and other public and commercial venues, enjoy the electricity reserves provided by the utility companies, and in turn each pay a corresponding "line charge" for these reserves. The actual electricity consumptions for these large electricity demand centers are often cyclic, with large peak electricity demand occurring for only a short amount of time in a demand cycle (e.g., a day, or a week, or a month, etc.), followed by long periods of much lower demand levels. There is therefore great incentive and interest for the large electricity demand centers to utilize the grid reserve during the off-peak demand hours.

Conventional on-board charging systems on electric vehicles typically require a static starting maximum charging power (e.g., a maximum charging current (e.g., 8 A, 12 A, 48 A, etc.), or a maximum charging voltage (e.g., 120V, 240V, 480V, etc.)) that are maintained substantially constant during charging, and only start to decline when the batteries are charged to a certain level (e.g., 80%). Sometimes, trickle charging is started with a lower static charging power (e.g., a lower charging current or voltage) until the batteries are fully charged. The conventional charging also can be delayed and started on a timer (e.g., based on user-defined charging profiles that specify start time and end time of a charging period during user-specified off-peak hours). The conventional on-board charging systems do not accommodate dynamic variations of charging power based on external factors, after the charging has been started at a given charging power level and before the charging of the battery is completed or the charging system is disconnected from the power source. There is also no coordination between the charging powers of multiple charging stations during the active charging periods at the multiple charging stations. As set forth later in this specification and in the aforementioned related applications, an innovative combined charging and traction system is adaptive to dynamically varying charging power during a charging phase of the combined charging and traction system. This enables the charging stations to adjust charging output powers dynamically at different charging stations based on the available grid reserves at the moment and the states of charging at the different charging stations. The stringent requirements for separately establishing separate grid reserve for the electric vehicle charging stations are thus eliminated or largely reduced.

As set forth herein, an electric vehicle charging facility management device of a large electricity demand center determines an electricity consumption cap for a current electricity consumption cycle (e.g., a day, a month, a quarter, a year, or any other period that is dictated by how frequently quantity of grid reserve is measured and charged by utility companies) based on an estimated maximum electricity demand level (e.g., based on past load monitoring at the input main of the electricity demand center), monitors actual electricity load on the circuits of the electricity demand center, and determines in real-time how much grid reserve below the electricity consumption cap is available for electric vehicle charging. Based on the real-time load monitoring on the primary electricity usage circuits, the electric vehicle charging facility management device determines the starting charging power and the subsequent charging power for each charging station during the active charging period of the different charging stations. The electric vehicle charging facility management device also optionally takes into account the different needs, capacities, routes, battery types, and other characteristics of the electric vehicles and/or their on-board charging systems to determine how to coordinate the charging at the multiple charging stations. The electric vehicle charging facility management devices as described herein help the large electricity demand centers, such as stores, office buildings, stadiums, warehouses, and other public and commercial venues, to overcome the technical, logistical, and economic hurdles currently present and to provide low cost, efficient charging stations that not only make use of underutilized grid resources but also bring in additional business and customer traffic (e.g., by offering the electric vehicle charging services) to further utilize other underutilized facilities and resources at the large electricity demand centers.

With large electricity demand centers that also have their own fleets of electric vehicles (e.g., ambulances, delivery trucks, company commute buses, government vehicles, etc.) that travel through multiple associated large electric demand centers under a common ownership or management, the electric vehicle charging facility management devices at the multiple associated large electric demand centers optionally perform additional coordination based on the schedules, routes, electricity usage, importance level, etc. of the individual fleet vehicles that visit the respective charging facilities at the multiple associated large electric demand centers. The additional level of coordination provides additional opportunities to save time, better utilize reserved grid resources, and reduce operational costs of the electricity demand centers and the charging facilities.

As for smaller venues and home charging users, a similar charging management device that monitors the actual load on circuits other than the electric vehicle charging circuit(s) provides useful information for dynamically controlling charging power given to the charging vehicles. For example, a circuit breaker at the input main of the house has a maximum tripping current and it takes a minimum of twenty seconds for the circuit breaker to cut the power to the house when the overall current draw from the input main exceeds the maximum tripping current of the circuit breaker. The charging management device's response time is less than one second and is configured to quickly lower the charging current to the electric vehicle charging circuit(s) such that the overall load on the input main falls below the maximum tripping current before the circuit breaker trips. In addition, with the knowledge of schedules of the family members with electric vehicles, and the electricity cost throughout the day, the charging management device can intelligently and dynamically adjust the charging power used to charge each electric vehicle at the house, to improve charging speed and lower charging cost, without affecting other electric usage at the house.

Currently there are many electric vehicle charging systems on the market, each designed to work with only some of the on-board charging systems on the market. The owners of electric vehicles must also possess various means of payment to use various types of charging stations. A human-machine user interface is required at each charging station to receive payment or account information for the charging operation. Security systems (e.g., encryption and tamper proofing) are also required at each charging station to maintain security of the user's payment and account information. Due to the additional components (e.g., displays, input systems, advanced processing units, physical and mechanical security components, proprietary charging plugs and connectors, etc.) needed to build the charging stations, the availability of charging stations are severely limited. In addition, when using the charging stations, the user must directly interact with the user interface provided on the charging station (e.g., scan a card, key in a code, select an instruction from a menu, etc.), in addition to plugging in the charging cable to the vehicle or battery. This is cumbersome and sometimes prolongs the time that the user has to physically remain at the charging station, which may create additional safety concerns and discomfort for the users.

Using the charging systems described herein, the vehicle connected to the charging station is identified based on direct communications between the charging station and the on-board charging system (e.g., through the electrical connection or a wireless connection between the charging station and the on-board charging system of the vehicle), and subsequent communication is initiated by the charging system or a server in communication with the server and sent to a user device associated with the on-board charging system. The user of the electric vehicle provides the necessary payment and authorization information through the user interface of the user device, without directly interacting with any human-machine interface provided on the charging station. This way, the subsequent communication can be performed after the user is sitting back inside the vehicle or after the user has walked away from the vehicle and the charging station. Through communication between the server and the user device, the payment information is also secured through the direct communication channel between the user device and the server, rather than going through the charging station. The charging station can thus be made with much lower cost and the availability of the charging station can be improved accordingly.

As also described in the prior related application, one way to reduce the cost of a charging system is to reduce the number of components required, and/or by incorporating components that serve multiple purposes. In some circumstances, the design of a charging system that is to be installed on an ordinary passenger car is subject to constraints such as size limits, weight limits, and vehicle emissions standards. On the other hand, some electric vehicles, such as special-purpose vehicles for commercial or construction environments, are larger and can tolerate larger sizes and heavier weights of on-board charging systems, and but may be subject to higher emissions restrictions. Systems and methods are provided herein for lower cost, on-board combined charging and traction systems for electric vehicles, including special-purpose electric vehicles. Such systems and methods may complement or replace conventional methods for electric vehicle charging. As disclosed herein, the combined on-board charging and traction system is capable of dynamically adjusting the charging voltage/charging power in real-time in accordance with the instructions of one or more on-board controllers of an electric vehicle, where the controllers communicate with and are subject to control of the charging control module of an electric vehicle charging facility management device, in accordance with some embodiments.

FIG. 1 is a schematic diagram illustrating an example operating environment 100 of an electric vehicle charging facility in accordance with some embodiments.

As shown in FIG. 1, an input main 102 of an electricity demand center (e.g., a public or private facility that uses electricity supplied from the power distribution network of a utility company) is connected to the electric grid 104 (e.g., the public electricity transmission and distribution network), and a main input circuit breaker 106 is installed to monitor and restrict the total current draw of the electricity demand center from the grid. The maximum breaker current is set by the circuit breaker 106 in accordance with the instruction by the utility company. The circuit breaker 106 will trip if there is a surge in current above the maximum breaker current through the circuit breaker 106, and the electrical connection from the grid 104 to the breaker panel 108 will be broken and electrical supply to the circuits in the electricity demand center will be cut off. There are also electricity meters at the input main 102 to measure the total electricity usage in a predefined time period (e.g., per month or per quarter, etc.). The breaker panel 108 provides the electricity to all circuits at the electricity demand center, including non-EV-charging circuits 110 and EV-charging circuits 112.

The utility company provides electricity to many electricity demand centers. Based on the peak current requirement and the total electricity usage of each electricity demand center and based on the timing of such peak current requirements by the different electricity demand centers, the utility company adjusts the amount of electricity that is made available to its customers at different times (e.g., by releasing/accumulating electricity reserves, turning on or shutting off various generators, putting restrictions on electricity usage for various electricity demand centers, and/or changing pricing and incentives for electricity usage), such that all customers' demands are met. Because the usage prediction by the electricity company is not perfect, there are always unutilized grid reserves and the electricity company charges its customers for such unused reserves in the form of a "line charge" which is typically calculated based on the peak electricity usage of each customer over a predefined period of time. If the electricity reserve is better utilized, the waste of resources at the electricity company can be reduced.

The electricity demand center has its own breaker panel 108 that manages internal electricity usage for various parts of the facility. In some embodiments, some of the circuits (e.g., primary circuits 110) are reserved for normal facility usage (e.g., primary uses other than charging electric vehicles). The usage on these circuits (e.g., circuits 110) have higher priority relative to electric vehicle charging and/or are not dynamically adjusted based on other electricity needs at the electricity demand center. Before electric vehicle charging is permitted or enabled at the electricity demand center, the electricity drawn on these circuits (e.g., circuits 110) constitutes the total electricity usage at the electricity demand center.

In some embodiments, when electric vehicle charging is enabled at the electricity demand center, a separate set of circuits (e.g., circuits 112) from the breaker panel 108 are used for electric vehicle charging. In some embodiments, the set of circuits (e.g., circuits 112) include individual electric charging stations 116 equipped with specialized connectors that plug into the on-board charging systems of electric vehicles. In some embodiments, the set of circuits (e.g., circuits 112) include regular electric outlets that are similar or identical to those for regular electricity usage by other appliances. In some embodiments, the charging stations 116 are equipped with control modules that automatically adjust the output voltage and/or current of the charging stations (e.g., in accordance with inputs received from a grid monitor 118 (also referred to as "load monitor 118") and EV charging control module 120 (e.g., embodied in a charging facility management device 114) and/or from administrative personnel). In some embodiments, the on-board charging systems of the electric vehicles 124 are equipped with control modules that automatically adjust the charging voltage and/or current that are received from the circuits 112 in accordance with instructions received from the charging facility management device 114 or a corresponding server in communication with the charging facility management device 114.

In some embodiments, the grid monitor 118 is installed between the grid 104 and the input main 102 of the electricity demand center, so that the total current and voltage received by the electricity demand center is monitored in real-time by the load monitor 118. The total power that is drawn by the electricity demand center includes the power delivered via the first set of circuits (e.g., circuits 110) for the non-EV charging uses, and the second set of circuits (e.g., circuits 112) that are being used for electric vehicle charging. As set forth in more details later in this specification, the grid monitor 118 provides the input data for the charging control module 120 to determine how much power should be delivered to the second set of circuits 112 as a whole, and how to distribute the power among the different vehicles 124 that are being charged. In some embodiments, an electricity reservoir 122 (e.g., batteries or super capacitors) is also installed on the second set of circuits (e.g., circuits 112), and the electricity reservoir 122 is used to store electricity and release electricity in accordance with the instruction of the control module 120. In some embodiments, an internal power generation unit (e.g., solar panels) is also installed that supplements the power used by the electricity demand center. The power produced by the internal power generation unit is also monitored by the grid monitor 118 in real-time. In some embodiments, the charging stations 116, the electricity reservoir 122, and/or the on-board charging system of the electric vehicles sends real-time electricity input and output levels to the grid monitor 118 or the charging control module 120 over the power lines or wirelessly, so that the individual usage and supply of electricity at the electricity demand center can be determined.

In some embodiments, there are physical data connections between the charging facility management device 114 (e.g., including the grid monitor 118 and the control module 120) and the on-board control modules of the electric vehicles 124. The instructions and the inputs are transmitted from the charging facility management device 114 via the physical data connections to the on-board control modules of the electric vehicle 124. In some embodiments, there is no physical data connection between the charging facility management device 114 and on-board control modules of the electric vehicles 124, and the communications are made wirelessly over a data network (e.g., a WiFi network, a Bluetooth connection, etc.). In some embodiments, the control module 120 of the charging facility management device 114 includes a central control module located in proximity to the grid monitor 118, and a plurality of individual control modules distributed at various charging stations 116 at the electricity demand center. The communication between the individual control modules and the central control module can be wired or wireless. In some embodiments, there is no special charging station required, and the electric vehicle charging can be accomplished at regular electricity outlets that are useable by other types of electric appliances (e.g., vacuum cleaners, desk lamps, air conditioners, etc.). In such cases, the charging control is accomplished by the control module 120 alone or in coordination with the on-board control modules of the electric vehicles 124. For example, in an embodiment where the charging is accomplished using a regular electric outlet at the electricity demand center, the on-board control module of the electric vehicle 124 reports wirelessly or over the power lines to the charging control module 120 that is has been plugged in, and receives data and instructions from the charging control module 120 wirelessly or over the power lines to determine the charging voltage and/or current that it should draw from the electric outlet. In some embodiments, by allowing electric vehicles to be charged using a non-dedicated electric outlet, and allowing the electric vehicles or a customer (e.g., using a user device) to self-report to the control module 120 about its own charging needs and status, the cost and technical difficulty of providing electric vehicle charging at the electricity demand center is largely reduced.

Figure 2:
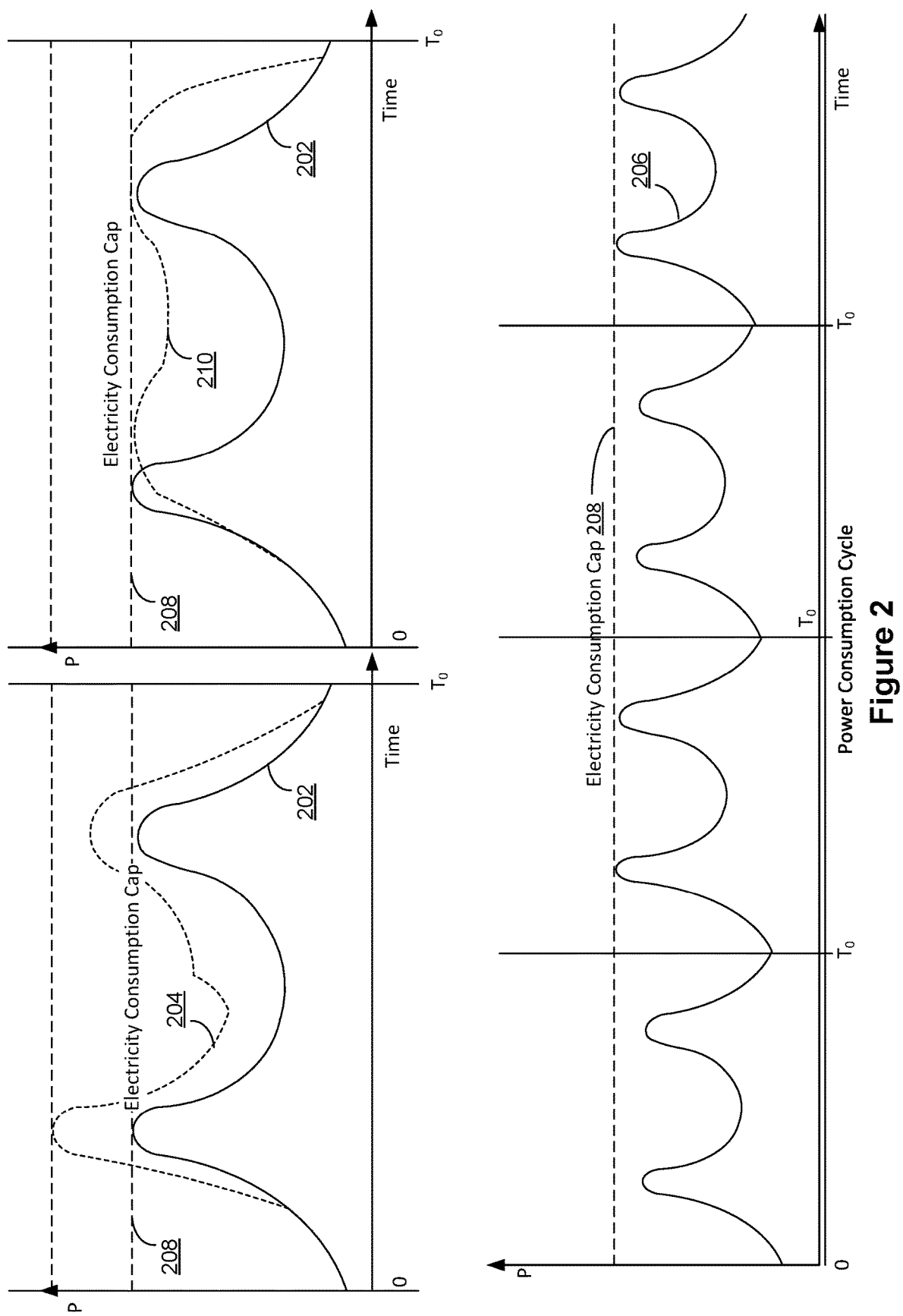
FIG. 2 is a schematic diagram illustrating electricity consumption patterns of a conventional large electricity demand center with and without an electric vehicle charging facility.

FIG. 2 is a schematic diagram illustrating electricity consumption patterns of a conventional large electricity demand center with and without an electric vehicle charging facility, in accordance with some embodiments.

As shown in FIG. 2, the solid curve 202 is the total electricity consumption pattern of the large electricity demand center (e.g. a shopping mall) during a day without enabling electric vehicle charging in accordance with the method described herein. This pattern 202 is typically repeated with small variations every day during an electricity consumption cycle (e.g., weekly, monthly, or quarterly), as shown by curve 206 in the lower portion of FIG. 2. The utility company reserves electricity for the electricity demand center based on the maximum power usage and apply a corresponding "line charge" based on the maximum power usage during the electricity consumption cycle. If electric vehicle charging were enabled and the charging were allowed in an on-demand fashion at preset power levels (e.g., a constant charging current of 24 Amps), the cyclic pattern of electricity usage would be disrupted and the peak electricity consumption from day to day would vary greatly (e.g., as shown by the dashed curve 204), resulting in unpredictably high line-charges and waste of grid reserves. If, instead, electric vehicle charging is managed in accordance with the methods described herein, the charging power of electric vehicles are dynamically adjusted (e.g., charging powers for individual electric vehicles are adjusted to ensure that the total power consumption cap 208 of the electricity demand center is observed), the original electricity consumption peaks of the electricity demand center is left undisturbed or only moderately increased, and the previously underutilized electricity reserve during the low consumption periods are utilized (e.g., as shown by dashed curve 210), resulting in no or little extra line charge and better usage efficiency of the grid reserves.

In some embodiments, the electricity consumption cap 208 is selected based on the maximum power usage during the electricity consumption cycle, that is predicted based on past electricity consumption patterns observed for multiple electricity consumption cycles before electric vehicle charging is made available at the electricity demand center. Electric vehicle charging needs are estimated based on other factors, such as percentage of visitors that own electric vehicles and their visit schedules, and an electricity consumption cap is adjusted while taking into consideration a small portion of the estimate of electricity vehicle charging needs that cannot be shifted away from the peak electricity consumption period based on adjustment of charging power. For example, some of the electric vehicles do not allow adjustment of charging power due to limitations of their on-board charging systems, and do not have flexibility in terms of shifting their charge time away from the peak electricity consumption period (e.g., due to limitations of their duties, battery capacities, and schedules, and lack of alternative charging locations, etc.). The electricity consumption cap 208 is adjusted higher to accommodate the charging needs of such types of electric vehicles.

In some embodiments, the electricity consumption cap 208 is selected based on the maximum current allowed by the circuit breaker at the main input of the electricity demand center. For example, in some cases, the main limitation on whether an electricity demand center is willing or able to allow electric vehicle charging is the capacity of the circuit breaker at the input main of the electricity demand center. Although the line charge may be distributed to the customers who use the charging facility, replacing the circuit breaker is very expensive and may pose an upfront cost that the owner of the electricity demand center cannot afford to pay. Thus, by ensuring that the electricity consumption is kept below the circuit breaker current by dynamically monitoring the electricity consumption and adjusting charging powers allowed at the charging stations, the electricity demand center is able to offer electric vehicle charging services without making substantial infrastructure changes, such as replacing the main circuit breaker of the electricity demand center.

Figure 3:
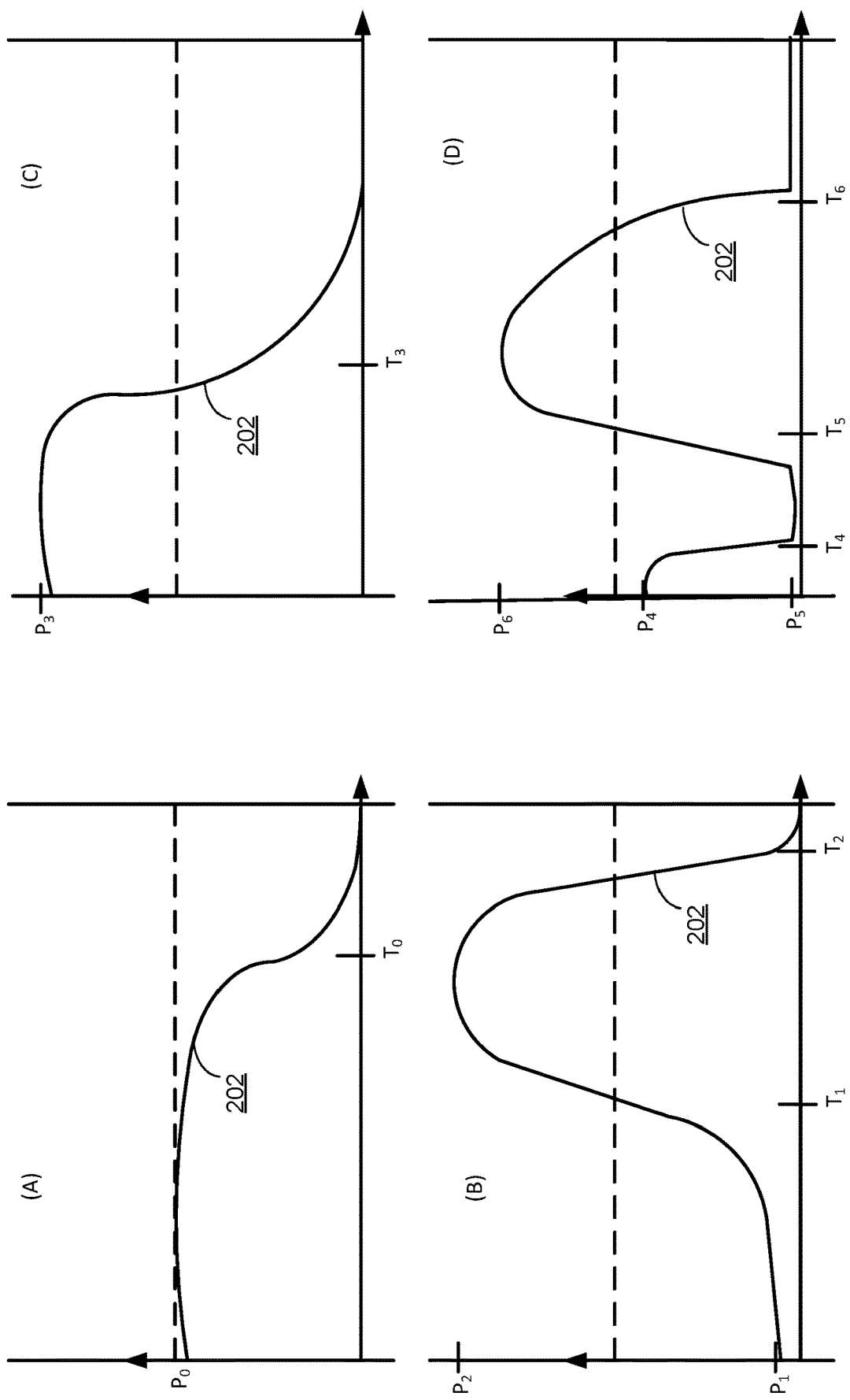
FIG. 3 is a schematic diagram illustrating adaptive electric vehicle charging based on grid monitoring in several example scenarios, in accordance with some embodiments.

FIG. 3 is a schematic diagram illustrating adaptive electric vehicle charging based on grid monitoring in several example scenarios, in accordance with some embodiments.

FIG. 3(A) illustrates the charging profile of a conventional electric vehicle charging system. The charging power is preset at a level $P_0$ that is independent of the electricity usage of the electricity demand center (e.g., usage pattern, or current usage) or any variable characteristics of the electric vehicle (e.g., schedule, current charge level, priority, etc.). The charging power is substantially constant for an entire duration of the charging (e.g., T0) until the vehicle is fully charged or almost fully charged.

FIG. 3(B) illustrates a charging profile of an electric vehicle in accordance with some embodiments of the technology disclosed herein. When the electric vehicle is first plugged in, the non-EV-charging electricity usage at the electricity demand center is relatively high, and the charging power of the electric vehicle is set at $P_1$ which is substantially lower than $P_0$. For example, the charging power is calculated in accordance with the difference between the electricity consumption cap and the current non-EV-charging usage level, divided among the electric vehicles that are currently charging at the electricity demand center. The division is optionally weighted based on the total amount of charge still needed for each vehicle, the maximum amount of time that each vehicle can remain plugged in at the electricity demand center, the relative priority levels of the electric vehicles, alternative charging options at other future destinations of the vehicles, and/or acceptable ranges of charging power permitted by the electric vehicles, etc. After an initial period $T_1$ of charging at power level $P_1$, the charging power of the electric vehicle is increased to $P_2$ which is much higher than $P_0$. This transition is triggered by a reduction of the non-EV charging usage, or completion of charging on one or more other electric vehicles, or a change in charging priority of the electric vehicle relative to other charging vehicles (e.g., due to a change in departure schedule of one or more of the charging vehicle), or an increase in power production from an internal power supply (e.g., from solar panels), or a combination of one or more of the above factors, for example. The charging level remains at $P_2$ until the electric vehicle is fully charged (e.g., in a time period that ended at $T_2$). The total charge time $T_1+T_2$ can be longer or shorter than $T_0$, depending on the actual charging levels $P_1$ and $P_2$ and the actual durations of $T_1$ and $T_2$. In some embodiments, the departure schedule of the electric vehicle is set by the user of the electric vehicle when the vehicle is plugged in and may be updated after the vehicle has started charging. In some embodiments, the charging facility management device estimates the power usage on the non-EV-charging circuits and the power needs on the EV-charging circuits for various time periods, and selects the power charging levels for the electric vehicles such that only a limited number of significant changes (e.g., change/time is above a preset threshold) in power levels occur during the charging of the electric vehicles.

FIG. 3(C) illustrates a charging profile that is constrained by charging time. For example, when a vehicle must be charged to a certain level within a small amount of time (e.g., $T_3$) after it is plugged in, the vehicle is given a higher charging priority relative to other charging vehicles; and to the extent that the power consumption cap is observed, the charging is started at a high power level $P_3$ that is calculated based on the electricity consumption cap, the current non-EV charging usage, and the charging needs and priority of other vehicles that are also being charged at the electricity demand center.

FIG. 3(D) illustrates a charging profile that includes changing charging powers through multiple periods, including a reduction in charging power from $P_4$ to $P_5$ after an initial charging period of $T_4$, and an increase in charging power from $P_5$ to $P_6$ after a low charging period $T_5$. The charging power remained high at $P_6$ for a period $T_6$ until the electric vehicle is fully charged. The reduction of charging power during $T_5$ can occur during the period of the peak non-EV charging usage; and after the peak non-EV charging usage, the charging power is increased to utilize the unused grid reserve.

The charging profiles shown in FIG. 3 are merely illustrative. In actual practice, the charging profiles of electric vehicles can have many different shapes. In addition, the charging power may not stay constant for extended periods of time and may dynamically change in real-time constantly.

In some embodiments, the charging facility management device imposes constraints on how quickly charging power should change and a maximum number of changes that a vehicle can be required to make during a plug-in charging session, in order to reduce wear on the battery and on-board charging system of the electric vehicle. In some embodiments, the charging facility management device imposes a policy for only reducing the charging power when the electricity consumption cap is being approached as a result of the EV-charging. For example, under such a policy, all electric vehicles start at a default charging power (e.g., upon being plugged in), and the charging power is temporarily reduced in observance of the electricity consumption cap being reached due to increase in non-EV charging usage and/or increase in concurrent EV-charging by multiple vehicles. Other policies and constraints are possible, and will be apparent in light of other disclosures presented herein.

Figure 4:
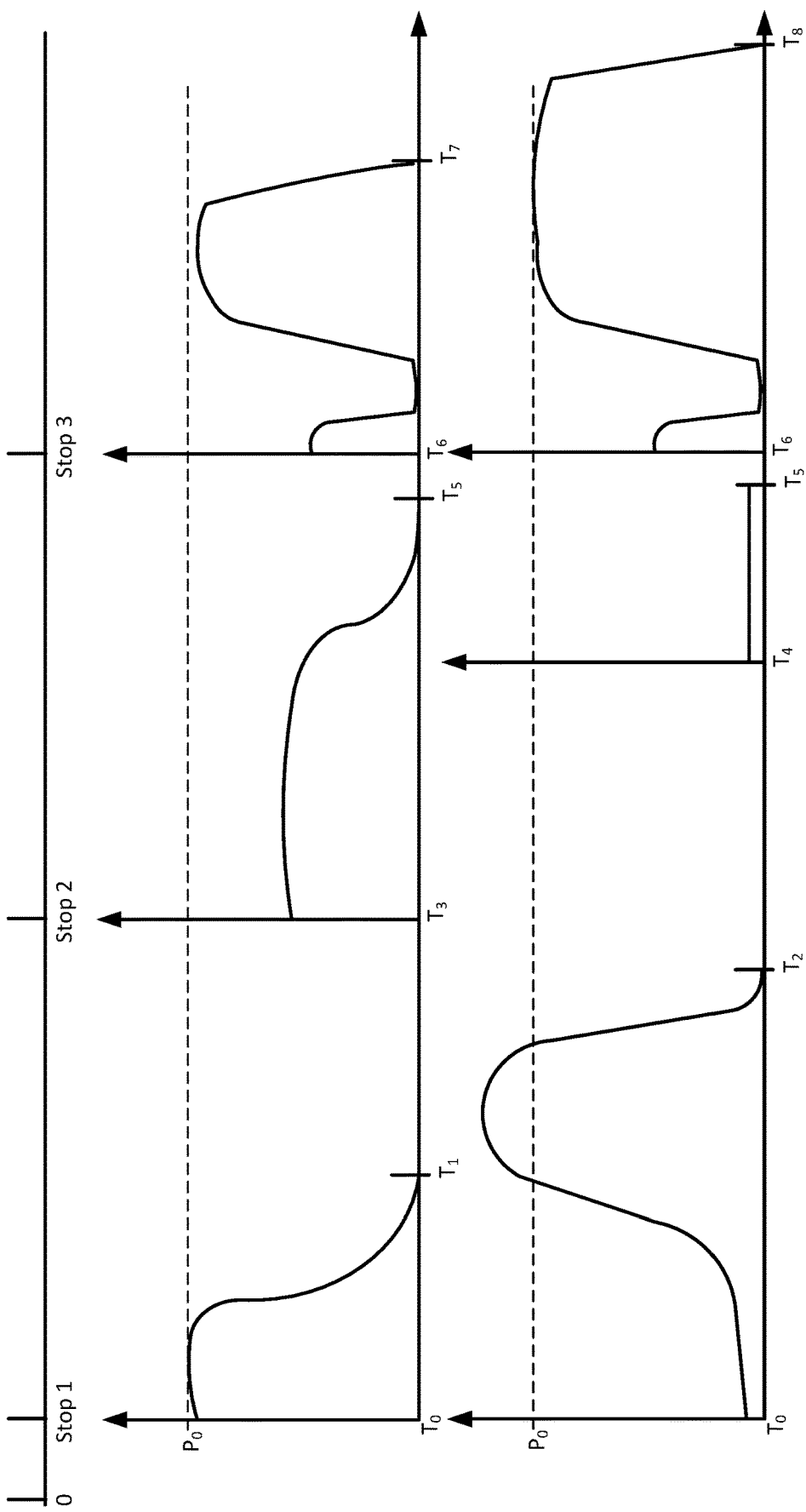
FIG. 4 is a schematic diagram illustrating coordinated adaptive electric vehicle charging among multiple charging facilities along two vehicles' planned route, in accordance with some embodiments.

FIG. 4 is a schematic diagram illustrating coordinated adaptive electric vehicle charging among multiple charging facilities along a vehicle's planned route, in accordance with some embodiments. The coordination between multiple vehicles is optionally opted in by the vehicles under common control (e.g., fleet cars belonging to the same company), in some embodiments. For example, delivery trucks under common control may share delivery schedules and routes, and ascribe to a common charging priority policy. In some embodiments, the charging facility management device identifies the vehicles under the common control by their unique identifiers received from the on-board charging systems of the vehicles, and obtains their respective scheduling information, routes, charging needs, and relative charging priorities from a server using the unique identifiers.

As shown in FIG. 4, in an example scenario, two identical delivery trucks D1 and D2 will both run along a route with three stops (Stop 1, Stop 2, and Stop 3). The two delivery trucks D1 and D2 have the same starting and end locations, so their charging needs when arriving at Stop 1 are the same. However, truck D1 will only stay at Stop 1 for a short period of time (e.g., $t=T_1-T_0$), while truck D2 will stay at Stop 1 for a much longer period of time (e.g., $t=T_2-T_0$). To observe the electricity consumption cap at Stop 1 during the time that D1 and D2 are parked at Stop 1, D1 is charged at a much higher power level than D2. The charging level of D1 is selected to ensure that D1 receives enough power to enable it to arrive at Stop 2. D2's charging power is kept at a low level until D1 stops charging at Stop 1. After D1 stopped charging and left Stop 1, the charging power of D2 is increased to a higher level in accordance with the amount of available charging power below the electricity consumption cap at Stop 1. D2 is left charging at the high power level for as long as D2 remained at Stop 1 because it is anticipated that by the time D2 arrives at Stop 2, the non-EV charging usage at Stop 2 would be at its peak. The charging facility managing devices at Stop 1 and Stop 2 notify of each other's anticipated non-EV charging usage in the upcoming hours, and determine mutually how to accommodate the changing needs of D1 and D2 based on their schedules while observing the local electricity consumption caps at Stop 1 and Stop 2. In this example, D2 was kept charging at a high level at Stop 1 for as long as D2 remained at Stop 1 and did not draw power when D2 stayed at Stop 2 (e.g., from time $T_4$ to $T_5$) during the peak non-EV charging period. D1 arrived at Stop 2 (e.g., at time $T_3$) before D1 did (e.g., at time $T_4$), and before the peak non-EV charging period started, and D1 was charged at a high level for a period of time such that it will have enough power to arrive at Stop 3. When both D1 and D2 arrived at Stop 3, the two vehicles enjoy the same priority level, and were charged with variable charging power levels in accordance with the non-EV charging usage at Stop 3.

In some embodiments, a charging facility management server that manages multiple electricity demand centers allows owners of vehicle fleets to negotiate a common charging price structure, and allows coordination between charging among its fleets of vehicles so as to take advantage of lower charging prices during off-peak electricity usage periods, and only pay higher prices for charging one or two of the fleet vehicles when necessary. In some embodiments, the charging facility management server provides a cost incentive structure that encourages vehicle owners to charge their vehicles during off-peak hours, and provides their trip information to the charging facility management server such that the charging of their vehicles can be accomplished at multiple locations along respective planned routes of the vehicles. In some embodiments, an owner of a vehicle can submit his trip information to the charging facility management server using a user device such as a smartphone or a tablet computer, while the server correlates the charging state of the vehicle and the trip information using a vehicle identifier associated with the trip information and the vehicle.

In some embodiments, the charging facility management server determines a minimum charging requirement, a target charging requirement, and a maximum charging requirement for each vehicle based on the information known about the vehicle, and dynamically determines the charging profile for the vehicle based on actual electricity usage situation at the different electricity demand centers. In some embodiments, the charging facility management server will always accommodate the minimum charging requirement, and will prioritize the target charging requirement whenever possible, and will only meet the maximum charging requirement of a vehicle when all target charging requirements of all charging vehicles currently plugged in are met.

Figure 5:
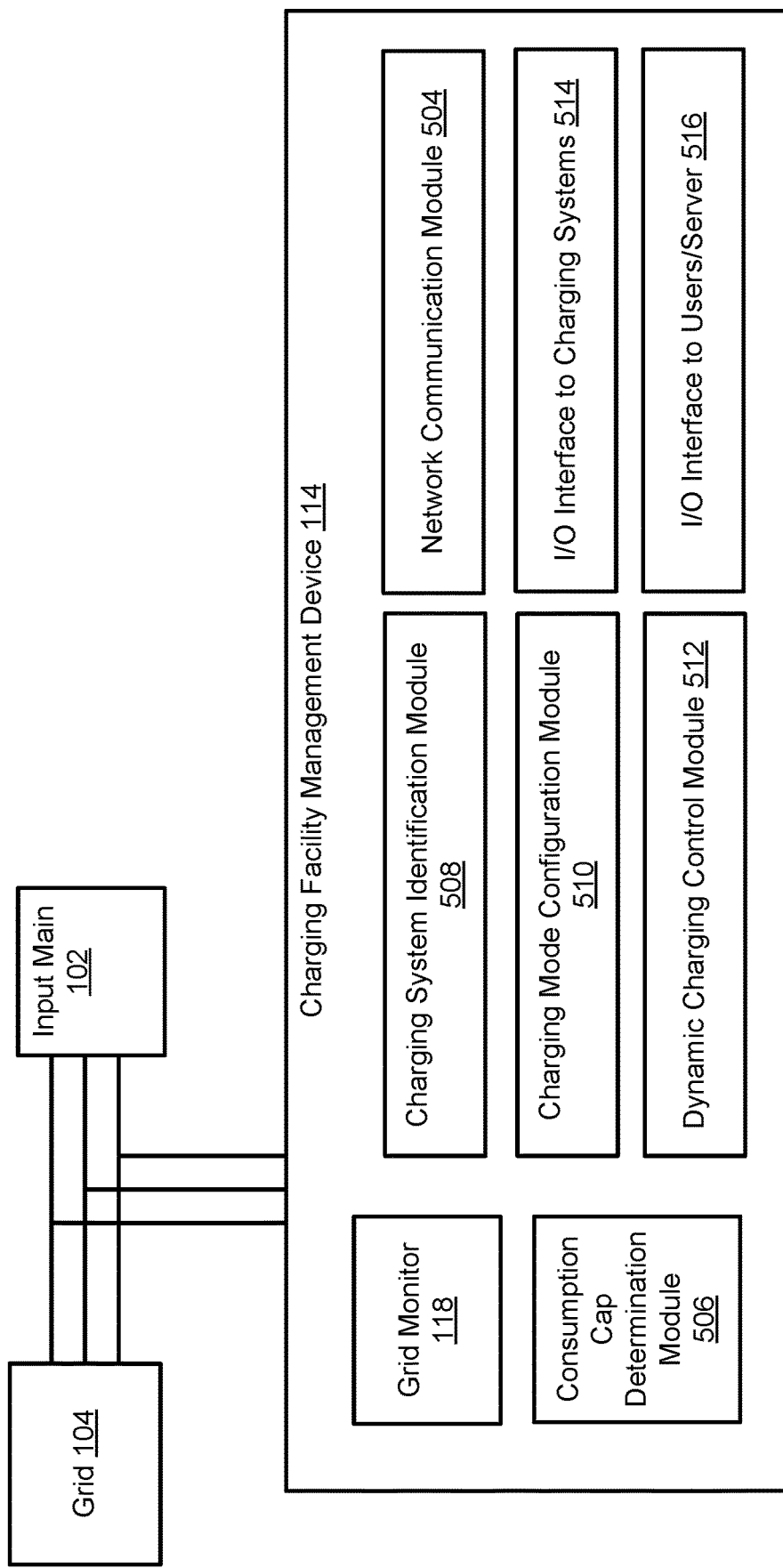
FIG. 5 is a schematic diagram illustrating an example charging facility management device that performs grid monitoring and adaptive electric vehicle charging control in accordance with some embodiments.

FIG. 5 is a schematic diagram illustrating an example charging facility management device 114 that performs grid monitoring and adaptive electric vehicle charging control in accordance with some embodiments.

As shown in FIG. 5, the charging facility management device 114 includes a grid monitor 118 (including voltage and/or current sensors) that is connected between the input main 102 and the grid 104. The total power that goes into the electricity demand center is monitored in real-time by the grid monitor 118. The grid monitor 118 senses the real-time current and voltage of the power lines going into the electricity demand center from the grid 104 using one or more load sensors. In some embodiments, the grid monitor 118 stores the electricity consumption data that has been accumulated at a data storage location that is accessible by the charging control module 120 of the charging facility management device 114.

In some embodiments, the charging control module 120 includes an electricity consumption cap determination module 506 that uses the past electricity consumption data (e.g., data regarding cyclic electricity consumption patterns and peak electricity consumption at the electricity demand center with and without EV-charging enabled), maximum current permitted by the circuit breaker at the main input of the electricity demand center, and/or electricity cost and discount schedules, etc., to determine an electricity consumption cap for the electricity demand center that is to be observed while EV-charging is enabled at the electricity demand center. In some embodiments, the charging control module 120 includes a charging system identification module 508. The charging system identification module 508 processes an identifier received from the charging electric vehicle, and identifies the charging electric vehicle from a database of electric vehicle charging systems using the identifier. The database includes user account information, payment information, vehicle route information, vehicle schedule information, and/or characteristics of the on-board charging systems (e.g., capacity, charging system types, maximum charging current, etc.). In some embodiments, the charging system identification module 508 receives the identifier encoded in a wireless signal transmitted from the charging electric vehicle to the charging facility management device. In some embodiments, the charging system identification module 508 receives the identifier encoded in an electric signal transmitted through a power line connected between the charging station and the charging electric vehicle, and the charging facility management device intercepts the signal and decodes the signal to obtain the identifier. In some embodiments, the charging control module 120 further includes a charging mode configuration module 510. The charging mode configuration module 510 prepares a charging profile based on the anticipated electricity usage at the electricity demand center, current and anticipated EV-charging electricity usage at the electricity demand center, the characteristics of the charging systems on the charging electric vehicles, and/or other information known about the charging electric vehicles (e.g., their identifiers, routes, schedules, affiliation with other electric vehicles on the site, etc.). In some embodiments, the charging facility management device 114 includes a dynamic charging control module 512 that modifies the current charging power of the electric vehicles based on real-time changes in the electricity consumption at the electricity demand center, e.g., based on the information collected from the grid monitor, and the information collected from the charging vehicles.

In some embodiments, the charging facility management device 114 includes a network communication module 504 that enables network communication (e.g., wired and/or wireless communication with one or more servers and/or user devices) over one or more networks (e.g., local area networks, wide area networks, the Internet, etc.) using various network communication protocols. In some embodiments, the charging facility management device 114 includes an input/output interface 514 to the on-board charging systems. The input/output interface 514 to the on-board charging systems optionally includes electric receptacles/outlets or connectors (e.g., J1772 connectors) to connect to the on-board charging systems of electric vehicles. In some embodiments, the input/output interface 514 also includes encoding/decoding modules for enabling data communication between the charging control module 120 and the on-board charging systems of the charging electric vehicles. In some embodiments, the charging facility management device 114 optionally includes input/output interface 516 to users and servers. The input/output interface 516 to users enables communication in text messages, displayed text and graphics, search queries, card scans, keyboard and touch-screen entries, etc. The input/output interface 516 to servers enables communication in messages, database queries, and other public or proprietary protocols.

The charging facility management device 114 shown in FIG. 5 is merely illustrative. In various embodiments, the charging facility management device may include fewer or more components. The components may be implemented in software instructions, hardware, firmware, or a combination thereof, to perform the operations described herein with respect to various embodiments.

Figure 6:
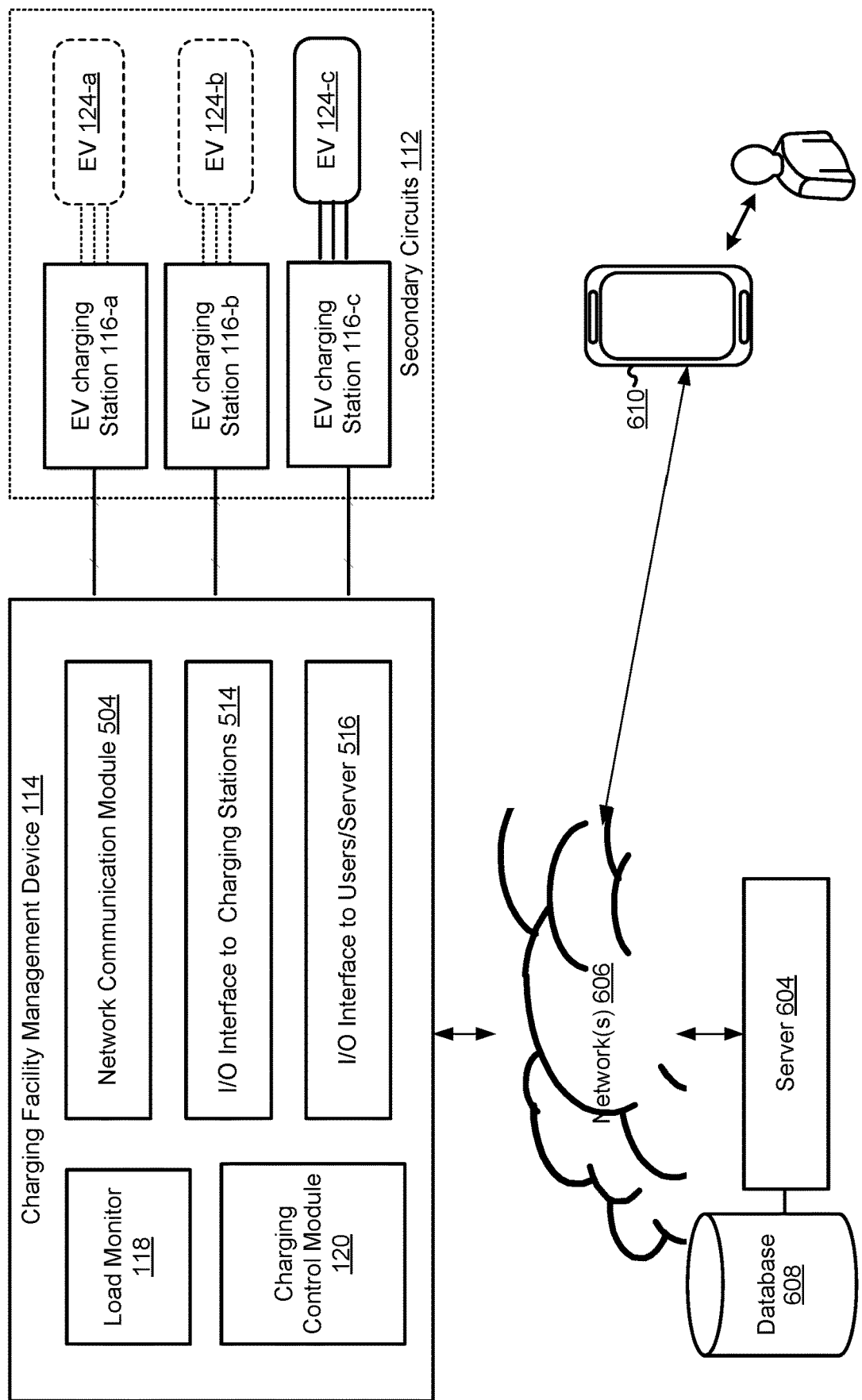
FIG. 6 is a schematic diagram illustrating a charging facility management device that performs vehicle identification and adaptive electric vehicle charging control in accordance with some embodiments.

FIG. 6 is a schematic diagram illustrating a charging facility management device 114 that performs vehicle identification and adaptive electric vehicle charging control in accordance with some embodiments.

As shown in FIG. 6, the charging facility management device 114 is connected to respective on-board charging systems of one or more electric vehicles 124 (e.g., 124-a for a first electric vehicle charging system, 124-b for a second electric vehicle charging system, 124-c for a third electric vehicle charging system, etc.) via respective electric connections. For example, the electric vehicle charging systems of the vehicles 124 are connected to the circuits of the electricity demand center via connectors provided at individual charging stations 116 or regular electric outlets provided at the electricity demand center. In some embodiments, the on-board charging systems of the charging electric vehicles 124 communicate wirelessly with the charging facility management device 114, e.g., via a wireless network (e.g., a WiFi network, a cellular network, a Bluetooth network, or other available networks) provided at the electricity demand center.

In some embodiments, the on-board charging systems of the electric vehicles 124 provide their identifiers to the charging facility management device 114, e.g., via direct wireless or wired connections to the input/output interface 514 of the charging control module. The charging control module 120 initiates communications with a server 604 over one or more networks 606 in response to receiving an identifier of a connected electric vehicle (e.g., 124-c). The communication optionally includes a copy of the identifier as a key to retrieve information from an account associated with an owner of the electric vehicle that is maintained in a database of the server. In some embodiments, the server retrieves the account information from the database based in the identifier received from the charging control module 120, and initiates communication with a user device 610, such as a smartphone or tablet device. In some embodiments, the communication is in the form of a text message or electric email message. In some embodiments, the communication is in the form of a pushed notification that is delivered to an application running on a user device 610 associated with the account. In some embodiments, a user can complete account transactions, such as providing configuration input to specify the duration and charging power preferences for the charging session, the route information for the electric vehicle, the scheduling information for the electric vehicle, and any coupons or discounts that the electric vehicle may quality, using the user device, as opposed to using an input/output user interface (e.g., display, touch-screen, keyboard, card scanner, etc.) provided at the charging station 116 itself. In some embodiments, the user also provides payment information (e.g., a credit card information, charge card information) or authorizes payment to be made from a pre-established online payment account using the user device 610. The payment information and authorization is transmitted through the communications between the user device 610 and the server 604, and no special physical or electric means of security is required at the charging station 116 itself. The identity verification between the server 604 and the user device 610 is performed optionally using conventional means involving encryption and passwords which can be updated frequently to improve security of the account information. In some embodiments, the charging control module 120 optionally sends the real-time electricity usage information at the electricity demand center to the server 604, and the server 604 determines the charging profile and the dynamic changes to the charging power for the control module 120 to implement at the electricity demand center. In such embodiments, the requirement for processing power and memory at the electricity demand center is lowered even more, further reducing the barrier for the electricity demand center to enable electricity vehicle charging. In some embodiments, the server 604 has vehicle charging information (e.g., identifiers and associated vehicle and account information) for vehicles at multiple electricity demand centers, and optionally coordinate the charging of multiple vehicles across multiple electricity demand centers (e.g., by taking into vehicle routes, vehicle travel schedules, locations and electricity usage situations at the multiple electricity demand centers, etc.). In some embodiments, the server 604 is optionally provided by a third-party that serves multiple unrelated electricity demand centers under separate management, and further reducing the cost and technical requirements on the individual electricity demand center for enabling electric vehicle charging at their respective sites.

The working configuration for the charging facility management device 114 shown in FIG. 6 is merely illustrative. In various embodiments, the charging facility management device may include fewer or more components. The components may be implemented in software instructions, hardware, firmware, or a combination thereof. In various embodiments, the communication sequence may also be changed to adapt to different scenarios.

The following describes an embodiment of an on-board charging system of an electric vehicle that is configured to utilize the charging facilities described herein, in accordance with some embodiments.

In some embodiments, the on-board charging system is a combined charging and traction system. In some embodiments, the on-board charging system is provided onboard an electric vehicle. The on-board charging system is able to accommodate a wide range of charging power variations, and is able to use both AC and DC charging modes. In some embodiments, the on-board charging system is configured to transmit a unique identifier corresponding to the on-board charging system along with other characteristic parameters of the charging system, such as total capacity, current charge level, maximum and minimum charging current required, etc.

In some embodiments, the on-board charging system includes an inverter (sometimes called a power inverter). In some embodiments, the inverter has an input terminal configured to receive DC power from a DC power source (e.g., a battery). In some embodiments, the input terminal of the inverter includes a positive terminal and a negative terminal. In some embodiments, the inverter receives DC power via the positive and negative terminals. In some embodiments, the inverter converts received DC power to AC power using a plurality of switches. In some embodiments, the plurality of switches of the inverter are power transistors (e.g., power MOSFETs, insulated-gate bipolar transistors (IGBTs), or other device suitable for high-power switching applications). In some embodiments, the on-board charging system includes control circuitry that controls turning on and off of the transistors (e.g., the control circuitry controls the voltages applied to the gates of the transistors) of the inverter, as described in further detail later. In some embodiments, the control circuitry includes controls for initiating the transmission of the identifier and associated information, and receiving information and instructions regarding the charging modes and profiles to be implemented and executed at the on-board charging system.

In some embodiments, the inverter has an output terminal configured to provide AC power. In some embodiments, the output terminal of the inverter includes a plurality of AC terminals. In some embodiments, the inverter is a three-phase inverter. In some embodiments, the invertor has different numbers of phases (e.g., single-phase). In some embodiments, the three-phase inverter includes three terminals used to provide three-phase AC power. In some embodiments, the inverter provides, via its output terminals, three-phase AC power that is converted from DC power received via its input terminals.

In some embodiments, the output of the inverter is coupled to a first motor. In some embodiments, the first motor is an electric motor driven by alternating current (e.g., an AC motor, such as an induction motor). In some embodiments, the first motor includes three terminals (e.g., AC terminals). In some embodiments, the terminals of the motor are coupled to the output terminals of the inverter, and in some such embodiments, the motor receives AC power from the inverter via the coupled terminals. In some embodiments, the motor is coupled to a shaft. In some cases, when AC power is applied to the motor (e.g., to the AC terminals of the motor), the motor applies torque to the shaft to rotate the shaft coupled to the motor.

In some embodiments, the on-board charging system includes a second motor. In some embodiments, the second motor is coupled (e.g., mechanically) to the first motor. In some embodiments, the first motor and the second motor are distinct motors, mechanically coupled by the shaft (e.g., a common shaft). In some embodiments, the first motor and the second motor are included within a single housing. In some embodiments, the first motor and the second motor are respective portions of a single motor. For example, for a single motor that includes a plurality of windings, the first motor may include a first subset of the plurality of windings, and the second motor may include a second subset of the plurality of windings. In some embodiments, the single motor is coupled to the shaft.

In some embodiments, the second motor is an AC motor. In some embodiments, the second motor includes three terminals (e.g., AC terminals). In some embodiments, the first motor is coupled to the second motor via the shaft (e.g., the first motor and the second motor are both coupled to the shaft).

In some embodiments, the on-board charging system includes a clutch. In some embodiments, the on-board charging system includes a plurality of wheels (e.g., four wheels). In some embodiments, the shaft is coupled to the clutch. In some embodiments, the clutch controls whether the shaft is coupled to or decoupled from the wheels. For example, in some cases, the shaft is coupled to the wheels when the clutch is engaged, and decoupled from the wheels when the clutch is disengaged. Alternatively, or in addition, the on-board charging system may include any other type of rotary engagement and disengagement device, such as a synchronizer, configured to control coupling or decoupling of the first motor and the second motor with the plurality of wheels.

In some cases, the rotation of the shaft (e.g., in response to torque applied by the first motor) produces AC power in the second motor (e.g., the second motor operates as a generator) which can be provided to a load via AC terminals of the second motor (e.g., in such cases, the AC terminals of the second motor serve as output terminals). In these cases, the first motor is associated with torque in a first direction (e.g., positive torque) and the second motor is associated with torque in a second direction (e.g., opposite the first direction) (e.g., negative torque).

In some cases, when AC power is applied to the second motor (e.g., to the AC terminals of the second motor), the second motor applies torque to the shaft to rotate the shaft. In some cases, when AC power is applied to both the first motor and the second motor, both the first motor and the second motor apply torque to the shaft to rotate the shaft. In these cases, the first motor and the second motor apply torque in the same direction to the shaft. Although the first motor and the second motor in this example are three-phase AC motors (e.g., driven by three-phase AC power), it will be readily appreciated that either or both motors may, in some embodiments, have different numbers of phases.

In some embodiments, the second motor is coupled to a converter. In some embodiments, the converter includes three AC terminals. In some embodiments, the terminals of the second motor are coupled to the terminals of the converter. In some embodiments, the converter includes positive and negative DC terminals. In some embodiments, the positive terminal and the negative terminal of the converter are configured to be coupled to positive and negative terminals, respectively, of a DC power source, such as a rechargeable DC power unit, optionally included as part of the on-board charging system. In some embodiments, the rechargeable DC power unit includes one or more forms of electrical energy storage, such as batteries or super capacitors. For example, the on-board charging system 700 a battery. In some embodiments, the positive terminal of the converter is coupled to the positive terminal of the battery. In some embodiments, the negative terminal of the converter is coupled to the negative terminal of the battery.

In some embodiments, the converter is a bidirectional inverter-rectifier. In some embodiments, the operation of the converter depends on the mode of operation of the on-board charging system. In some embodiments, the converter operates as an inverter (e.g., the converter converts AC power received using its AC terminals, serving as input terminals, to DC power output that is using its DC terminals, serving as output terminals). In some embodiments, the converter operates as a rectifier (e.g., the converter converts DC power received using its DC terminals, serving as input terminals, to AC power that is output using its AC terminals, serving as output terminals).

In some embodiments, the converter converts AC power to DC power, or DC power to AC power, using a plurality of switches. As described above with reference to the inverter, in some embodiments, the plurality of switches of the converter are power transistors (e.g., power MOSFETs, insulated-gate bipolar transistors (IGBTs), or other device suitable for high-power switching applications). In some embodiments, the on-board charging system includes control circuitry that controls turning on and off of the transistors (e.g., the control circuitry controls the voltages applied to the gates of the transistors) of the converter, as described in further detail later.

In some embodiments, the on-board charging system includes a resolver coupled to the inverter, the converter, and/or the shaft (e.g., coupled to the first motor and the second motor via the shaft), and configured to measure the rotation of the first motor and/or the second motor. In some embodiments, the on-board charging system includes one or more sensors to detect one or more parameters of the system (e.g., voltage, current, power, rotation, etc.)

In some embodiments, the on-board charging system includes a plurality of switches (e.g., four switches). In some embodiments, each of switches is configured to be in a respective switching state (e.g., open or closed). In some embodiments, the switches are mechanically controlled switches (e.g., controlled by an operator of the electric vehicle on which the on-board charging system is provided). In some embodiments, the switches are electronically controlled switches (e.g., relays). In some embodiments, the on-board charging system includes control circuitry that controls opening and closing the switches (e.g., the control circuitry controls the voltages applied to the switches), as described in further detail herein with reference to FIGS. 7 and 8.

In some embodiments, closing a first switch couples the positive terminal of the inverter to a positive terminal of a DC power source, such as the positive output terminal of the rectifier. In some embodiments, closing a second switch couples the negative terminal of the inverter to a negative terminal of the DC power source, such as the negative output terminal of the rectifier. In some embodiments, the on-board charging system includes a rectifier (e.g., the DC power source). In some embodiments, the on-board charging system is configured to receive AC power (e.g., using the rectifier) from an (external) AC power source, such as a power grid (e.g., via an outlet or charging station at an electricity demand center). In some embodiments, the rectifier includes an input terminal configured to receive AC power. In some embodiments, the input terminal of the rectifier includes a plurality of AC terminals. In some embodiments, the rectifier includes three terminals configured to receive three-phase AC power from a three-phase grid (e.g., via the electricity demand center shown in FIG. 1). The three-phase grid is not typically included as part of the on-board charging system. In some embodiments, the rectifier converts AC power received from the three-phase grid to DC power output using its output terminals. Although the on-board charging system can use poly-phase AC power, specifically three-phase AC power, it will be readily appreciated that it may operate using AC power with different numbers of phases, including single-phase power. As described herein, the AC power that is supplied to the on-board charging system may be adjusted dynamically based on the real-time electricity consumption at the electricity demand center (e.g., including the electricity consumption on the primary circuits (e.g., non-EV charging circuits) and electricity consumption on the secondary circuits (e.g., EV charging circuits)), and a pre-established electricity consumption cap for the electricity demand center.

In some embodiments, the rectifier is not part of the on-board charging system. In some such embodiments, the on-board charging system operates as a DC-to-DC converter (e.g., DC EVSE): for example, in charging mode (described in more detail herein), the on-board charging system receives power from an external DC power source using its terminals (as input terminals to the on-board charging system), at a particular input voltage, and converts the input voltage to an appropriate DC voltage for the battery (e.g., a DC charging voltage that complies with the specifications of the battery). In some embodiments, the electricity demand center includes an electricity reservoir 122 (e.g., See FIG. 1) (e.g., a battery or charge reservoir) that is configured to supply DC power to the EV charging circuits 112 when the electricity consumption at the electricity demand center is about to exceed the electricity consumption cap or when the electricity reserve in the electricity reservoir exceeds a predefined threshold. In some embodiments, the electricity reservoir 122 is charged when the electricity consumption is far below the electricity consumption cap of the electricity demand center, and/or when the alternative energy sources (e.g., solar panels) at the electricity demand center is producing power in excess of the electricity needs at the electricity demand center.

In some embodiments, closing a third switch couples the positive terminal of the inverter to the positive terminal of the battery. In some embodiments, closing a fourth switch couples the negative terminal of the inverter to the negative terminal of the battery.

In some embodiments, switches (e.g. the first, second, third, and fourth switches) are separate from each other (e.g., single pole single throw switches). But optionally, in some embodiments, two or more of four switches operate in conjunction with each other. For example, the first and second switches could be implemented using a double pole single throw switch. In another example, the first and third switches could be implemented using a single pole double throw switch. In yet another example, the four switches could all be implemented using a double pole double throw switch. Using double throw switches (e.g., for the pair (first and third switches), and/or for the pair (second and fourth switches)) reduces the chance of shorting the rectifier to the battery, which could cause system malfunction or even physical damage, such as when the system is coupled to a three-phase grid, and there is a mismatch between the output voltage of the rectifier and the DC voltage of the battery. An advantage of using double pole switches (e.g., for the pair (the first and third switches), and/or for the pair (the second and the fourth switches) is that both pairs of switches (e.g., the positive terminal and negative terminal) operate in conjunction with each other, simplifying the control circuitry required.

In some embodiments, the mode of operation of the on-board charging system depends on the particular configuration of the four switches.

In some cases, the on-board charging system is configured to operate in charging mode (e.g., a first mode of operation). In charging mode, the on-board charging system is configured to charge a rechargeable DC power unit (e.g., the battery).

An example of the operation of the on-board charging system in charging mode is described as follows. In charging mode, the first and second switches are closed, so that the rectifier is coupled to the inverter, and the third and fourth switches are open, so that the inverter is decoupled from the battery. The three-phase grid provides AC power to the three AC (input) terminals of the rectifier. The rectifier converts the AC power to DC power (e.g., rectifies the AC waveforms), and outputs the converted DC power via its DC (output) terminals. With the first and second switches in the closed position, the rectifier is coupled to, and provides DC power to, the inverter. The inverter converts the DC power from the rectifier to AC power, and provides the converted AC power via its three AC (output) terminals, which are coupled to the three AC (input) terminals, respectively, of the first motor.

When the AC power is applied to the first motor, the first motor applies torque to the shaft to rotate the shaft. In charging mode, the rotation of the shaft (e.g., in response to torque applied by the first motor) produces AC power in the second motor (e.g., the second motor operates as a generator). The AC power produced in the second motor is provided via the AC terminals (in these cases serving as AC output terminals) of the second motor to the AC terminals (in these cases serving as AC input terminals) of the converter. In charging mode, the converter converts the AC power provided from the second motor to DC power. The converter outputs the converted DC power via DC terminals (in these cases serving as DC output terminals) to the DC terminals of the battery, to charge the battery.

In some cases, the on-board charging system is configured to operate in traction mode (sometimes called driving mode, used for driving a vehicle on which the on-board charging system is installed) (e.g., a second mode of operation). In traction mode, the on-board charging system is configured so that the battery provides power to drive the first and the second motors of the on-board charging system (e.g., to propel a vehicle on which the on-board charging system is provided). Generally, operation in traction mode discharges the battery (e.g., the rechargeable DC power unit).

An example of the operation of the on-board charging system in traction mode is described as follows. In traction mode, the first and second switches are open, so that the rectifier is decoupled from the inverter, and the third and fourth switches are closed, so that the inverter is coupled to the battery. The battery provides DC power to both the inverter and the converter. In these cases, the DC terminals of the converter serve as input terminals, and the converter operates as an inverter. The inverter converts DC power from the battery to AC power to drive the first motor. The converter converts DC power from the battery to AC power, and provides AC power via the AC terminals (in these case serving as AC output terminals) to drive the second motor.

When the AC power is applied to the first motor and the second motor, both motors apply torque to the shaft to rotate the shaft. In traction mode, while the clutch is engaged, the shaft is coupled to the wheels. In such cases, the wheels are rotated in conjunction with the shaft as the shaft rotates. If the first motor and the second motor apply torque in a first direction of torque (e.g., positive torque), while the clutch is engaged, the vehicle is propelled in a first direction of movement corresponding to the first direction of torque (e.g., the vehicle is propelled or accelerated forward, or backward motion of the vehicle is slowed down (e.g., braked)). If the first motor and the second motor apply torque in a second direction of torque (e.g., opposite the first direction of torque) (e.g., negative torque), while the clutch is engaged, the vehicle is propelled in a second direction of movement (e.g., opposite the first direction of movement) corresponding to the second direction of torque (e.g., the vehicle is propelled or accelerated backward, or forward motion of the vehicle is slowed down (e.g., braked)).

In some embodiments, the on-board charging system determines whether to operate in charging mode or in traction mode. For example, in some embodiments, the system detects (e.g., includes control circuitry configured to detect) whether the system is connected to a power source (e.g., the electric vehicle on which the system is provided is plugged into three-phase grid 104). In some embodiments, in response to detecting that the system is connected to a power source (e.g., charging station 116 which draws power from the breaker panel 108 and/or directly from electricity reservoir 122), the system switches to the charging mode of operation. In some embodiments, in response to detecting that the system is disconnected from a power source, the system switches to the traction mode of operation. In some embodiments, the mode of operation of the system, optionally including control of the four switches, is determined and set by external circuitry in the vehicle on which the system is provided, as described in further detail FIGS. 6 and 9. In some embodiments, in response to detecting that the system is connected to a power source, the system transmits a unique identifier for the system to the charging facility management device 114 via the electric connection. In some embodiments, in response to detecting that the system is disconnected to the power source, the charging facility management device 114 transmits the unique identifier for the system to the server 604 to indicate that the system has been disconnected from the circuits 112 at the electricity demand center and a charging session has been completed.

In some embodiments, an example configuration in which a first motor and a second motor are distinct motors. The first motor and the second motor are mechanically coupled with a common shaft. In some embodiments, the first motor and the second motor are each coupled with respective shafts, such that the first motor has a first shaft, and the second motor has a second shaft, and the first and second shaft are mechanically coupled together using an appropriate mechanical power transfer method such as gears, belts, hydraulic coupling components, chains, etc. Two motor shafts can also be mechanically coupled together with gears, belts, hydraulic, chains or other mechanical power transfer methods.

In some embodiments, the first motor and the second motor are respective portions of a single motor. In some embodiments, the first motor corresponds to a first portion of the single motor, and the second motor corresponds to a second portion of the single motor. In some embodiments, the single motor includes a plurality of windings, the first motor includes a first subset of the plurality of windings, and the second motor includes a second subset of the plurality of windings. In some embodiments, the single motor, which includes both the first motor and the second motor, is coupled to the shaft.

In some embodiments, the single motor includes a plurality of windings. In some embodiments, a first set of windings correspond to the first motor. In some embodiments, a second set of windings correspond to the second motor. In some embodiments, the first set of windings of the first motor are alternated with windings of the second motor in the single motor. For example, the first set of windings alternate with the second set of windings. In some cases (e.g., charging mode), AC power applied to the first set of windings cause the single motor to apply torque to rotate the shaft; the rotation of the shaft generates AC power in the second set of windings. In other cases (e.g., traction mode), AC power applied to the first set of windings as well as to the second set of windings cause the single motor to apply torque to rotate the shaft using all twelve windings.

Different numbers of windings may be used, and that the windings need not alternate one by one. For example, 2 or 3 windings located together as a group is within the scope of the present application as long as they are alternated in a way with balanced load. More generally, the number of windings should be selected and the windings configured to alternate in such a way that the load on the motor and windings is balanced. For example, the windings may be alternated in groups of two (e.g., two adjacent windings from the first set of windings, followed by two adjacent windings from the second set of windings, followed by two more adjacent windings from the first set of windings, then two more adjacent windings from the second set of windings, and so on), or in groups of three (e.g., three adjacent windings from the first set of windings, followed by three adjacent windings from the second set of windings, and so on).

In some embodiments, a method of controlling charging and traction in a combined charging and traction system is performed by the on-board charging system. In some embodiments, the method is performed, at least in part, by one or more processors, such as processor(s) 1202 of the on-board charging system (e.g., system 1200 in FIG. 9). In some embodiments, some of the operations of the method are performed by processor(s) 1202, and other operations of the method are performed by other management and control units (e.g., some of the other operations of the method are performed by motor controller 1204, motor controller 1206 and/or VMU 1210, FIG. 9). In some embodiments, the method is governed by instructions that are stored in a non-transitory computer readable storage medium (e.g., memory 1208, FIG. 9) that are executed by one or more processors of a combined charging and traction system (e.g., processor(s) 1202 of the system 1200, FIG. 12).

Figure 9:
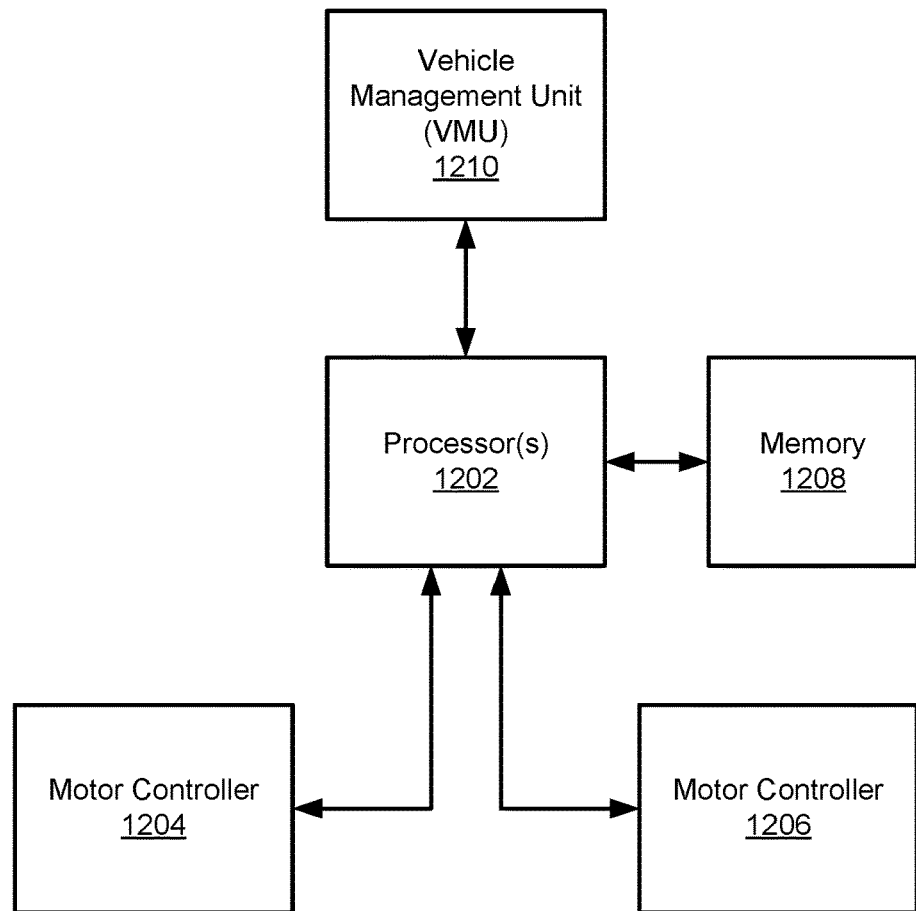
FIG. 9 is a block diagram illustrating example control circuitry in a combined on-board charging and traction system of an electric vehicle, in accordance with some embodiments.

For ease of explanation, the method is described herein as being performed by the on-board charging system (e.g., with respective operations being performed by respective components of system 1200) as shown in and described herein with reference to FIG. 9. In some embodiments, one or more operations of the method described below are performed in conjunction with control by an operator of the electric vehicle on which the on-board charging system is installed.

The system determines whether the system (e.g., the vehicle on which the system is installed) is connected to a charger (e.g., whether a charger is plugged in).

In accordance with a determination that the system is connected to a charger (e.g., the system is connected to an external power grid 104/712, and/or electricity reservoir 122) (902—Yes), the system begins operating in charging mode. In some embodiments, although the system is connected to a charger, the system waits for a separate instruction to begin operating in charging mode (e.g., from an operator of the vehicle on which the system is installed, such as by pressing a charging button or toggling of a charging switch, or otherwise activating the charging mode (e.g., via user device 610), or from the charging control module 120 or the server 604, via the charging station 116 or directly). In some embodiments, the system automatically enters the charging mode in response to detecting that a charger is connected. In some embodiments, the system transmits a unique identifier of the system to the charging facility management device 114 via the electric connection formed between the system and the charger.

To operate in charging mode, the system (e.g., processor(s) 1202, FIG. 9) disengages the clutch of the vehicle. In addition, the system (e.g., including processor(s) 1202, FIG. 9) opens the first and second switches (e.g., disconnects the inverter from the battery), and then closes the first and second switches (e.g., connects the inverter to the grid (e.g., grid 104 in FIG. 1)).

In charging mode, the system (e.g., motor controller 1204, FIG. 9) runs the first motor (e.g., a first motor) in constant speed mode at a set speed in a first (e.g., positive) torque direction. In some embodiments, the speed at which the first motor is run is determined in accordance with a charging power level determined by VMU 1210 (FIG. 9). While running the first motor at the set speed, the system (e.g., motor controller 1206, FIG. 9) maintains the second motor (e.g., a second motor) at zero torque (e.g., initially). After maintaining the second motor at zero torque, and while continuing to run the first motor at the set speed, the system (e.g., motor controller 1206) runs the second motor to apply negative torque (e.g., in regeneration mode, such that the second motor operates as a generator). In some embodiments, VMU 1210 determines the charging current required, and in some embodiments, the amount of negative torque from the second motor (controlled by motor controller 1206) is based on the determined charging current. In some embodiments, motor controller 1204 adjusts the speed at which the first motor is run so that the system provides the required charging current, and optionally so that the system operates more efficiently.

To finish charging mode operation, while continuing to run the first motor at the set speed, the system (e.g., motor controller 1206) sets the second motor to zero torque, and subsequently (e.g., via motor controller 1204) sets the first motor to zero speed (e.g., stops the first motor). Optionally, after charging has ceased, the system (e.g., processor(s) 1202) opens the first and second switches (e.g., disconnects the inverter from the grid), in which case the system may then optionally close the third and fourth switches (e.g., to connect the inverter to the battery, such as in preparation for traction mode).

In accordance with a determination that the system is not connected to a charger, the system begins operating in traction mode. In some embodiments, the system remains in an idle mode until receiving a separate instruction to begin operating in traction mode (e.g., from an operator of the electric vehicle on which the system is installed, such as by pressing an accelerator pedal) even if the system is not connected to a charger. In some embodiments, the determination whether the system is connected to a charger is made in response to an input to the system (e.g., in response to an operator attempting to press the accelerator pedal, the system determines whether a charger is connected; if not, the system enters traction mode, but if so, the system ignores the accelerator pedal input and optionally enters or remains in charging mode).

To operate in traction mode, the system (e.g., processor(s) 1202) engages the clutch of the vehicle. In addition, the system (e.g., processor(s) 1202) opens the first and second switches (e.g., disconnects the inverter from the grid), and then closes the third and fourth switches (e.g., connects the inverter to the battery).

In traction mode, the system runs both the first motor and the second motor with torque in the same direction (e.g., both positive or both negative torque) (e.g., motor controller 1204 runs the first motor, and motor controller 1206 runs the second motor). In some embodiments, the speed, or respective speeds, at which the first and second motors are run is determined in accordance with a traction power level determined by VMU 1210. In some embodiments, motor controller 1204 and the first motor operate independently of motor controller 1206 and the second motor, so that each motor controller-motor pair may operate with different respective torque outputs for more efficient operation (e.g., of each respective pair, and/or of the system as a whole).

To finish traction mode operation, the system sets both the first and second motors to zero torque (e.g., using motor controller 1204 and motor controller 1206, respectively). Optionally, after traction has ceased, the system (e.g., processor(s) 1202) opens the third and fourth switches 718a and 718b (e.g., disconnects the inverter from the battery), in which case the system may then optionally close the first and second switches.

Figure 7:
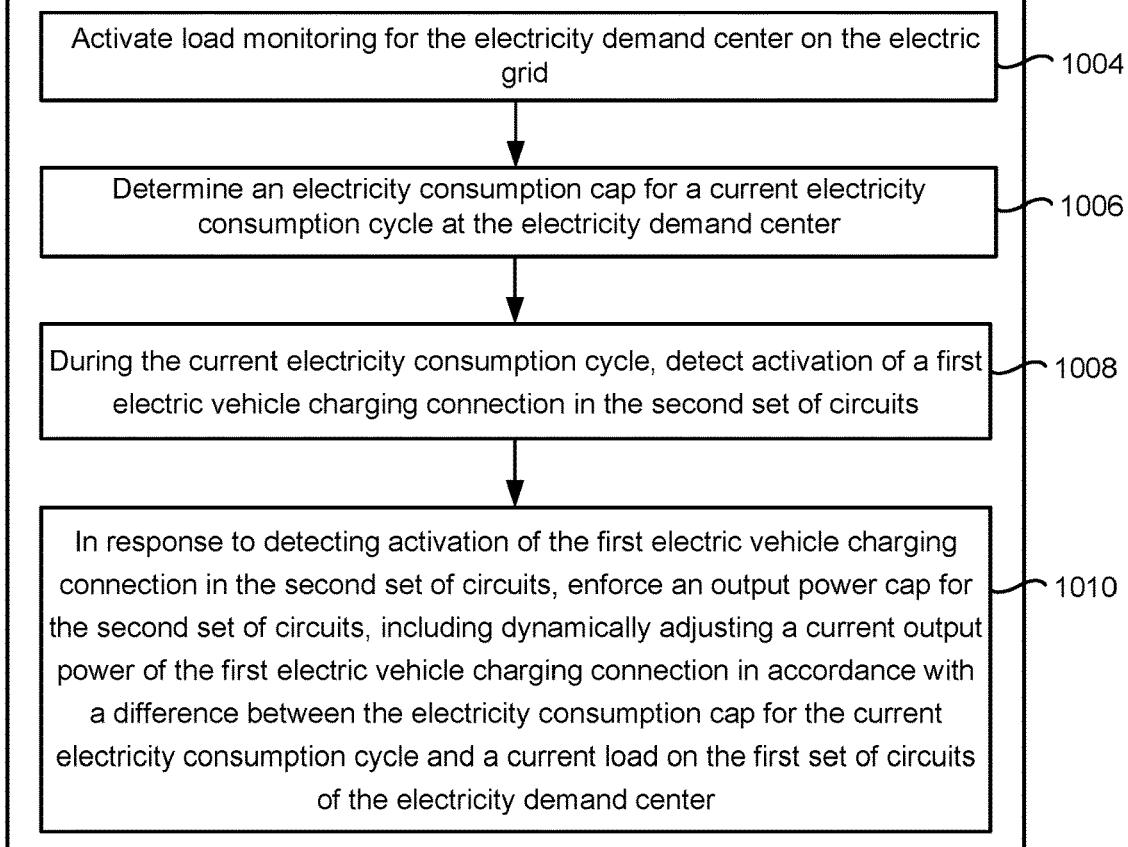
FIG. 7 is a flowchart of a method of controlling electric vehicle charging in accordance with some embodiments.

FIG. 7 is a flowchart of a method 1000 of controlling electric vehicle charging in accordance with some embodiments. The method is performed (1002) at an electronic device having one or more processors and memory (e.g., the charging facility management device 114, FIGS. 1, 6), where the electronic device is coupled to a main input (e.g., main input 102) of an electricity demand center on an electric grid (e.g., grid 104), and the electricity demand center includes a first set of circuits (e.g., primary circuits 110) configured to supply electricity to a first set of electrical devices (e.g., non-EV appliances) and a second set of circuits (e.g., secondary circuits 112) configured to supply electricity to respective on-board charging systems of one or more electric vehicles. The electronic device activates (1004) load monitoring for the electricity demand center on the electric grid. The electronic device determines (1006) an electricity consumption cap for a current electricity consumption cycle (e.g., a predefined time period for which a "line charge" is imposed for electricity reserve) at the electricity demand center. During the current electricity consumption cycle, the electronic detects (1008) activation of a first electric vehicle charging connection in the second set of circuits; and in response to detecting activation of the first electric vehicle charging connection in the second set of circuits, the electronic device enforces (1010) an output power cap for the second set of circuits, including dynamically adjusting a current output power of the first electric vehicle charging connection in accordance with a difference between the electricity consumption cap for the current electricity consumption cycle and a current load on the first set of circuits of the electricity demand center. In some embodiments, the electronic device monitors the total electricity output power at the input main, and does not directly monitors the output power on the first set of circuits. The electronic device monitors and controls the output power on the second set of circuits by providing instructions to the charging stations 116 and/or on-board charging systems of the charging electric vehicles 124 regarding the charging power allotted to the individual charging vehicles at the current moment and/or according to an individual charging profile assigned to each individual charging vehicle.

In some embodiments, the electronic device records variations in actual load on the first set of circuits (e.g., primary circuits 110) for at least a first period of time including multiple electricity consumption cycles; and in accordance with the variations in the actual load that have been recorded for at least the first period of time, the electronic device identifies a cyclic power consumption pattern (e.g., repeated pattern 206 or representative pattern 202 in FIG. 2) for the first set of circuits at the electricity demand center, wherein the cyclic power consumption pattern is defined by a peak load value and a period of off-peak load values surrounding the peak load value that recurred periodically during each of the multiple electricity consumption cycles (e.g., as shown in FIG. 2). For example, before electric vehicle charging is enabled at the electricity demand center, empirical data on non-EV charging electricity consumption is accumulated and studied, to determine the peak and off-peak electricity consumption at the electricity demand center, and to determine if there is an extended period of time each day where the electricity consumption is significantly below the peak consumption level; and if so, the grid reserve is not sufficiently utilized and enabling electric-vehicle charging in accordance with the method described herein would help to improve utilization of the grid reserve without triggering additional "line charge" for the electricity demand center.

In some embodiments, the electronic device determines the electricity consumption cap for the current electricity consumption cycle by: selecting the electricity consumption cap for the current electricity consumption cycle in accordance with the peak load value of the cyclic power consumption pattern. For example, the electricity consumption cap is selected to be the same as the peak load value of the cyclic power consumption pattern. Alternatively, the electricity consumption cap is selected to be the peak load value plus a fixed amount that is smaller than the amount of electricity to meet on-demand charging at the time when the peak load value usually occurs, such that the electricity consumption cap is lower than the anticipated peak load value with on-demand electric vehicle charging enabled.

In some embodiments, determining the electricity consumption cap for the current electricity consumption cycle includes selecting the electricity consumption cap for the current electricity consumption cycle in accordance with a configuration input received from a user. For example, an operator sets the electricity consumption cap based on the peak consumption value that is known to occur on particular days, such as weekends, Friday, Monday, Holidays, snow days, clean air day, etc. The consumption cap needs to be manually adjusted for such certain days on which the electricity consumption pattern does not follow the cyclic usage pattern of most other days.

In some embodiments, determining the electricity consumption cap for the current electricity consumption cycle includes selecting the electricity consumption cap for the current electricity consumption cycle in accordance with a maximum load allowed by a circuit breaker of the main input of the electricity demand center. For example, in a home setting, the utility company does not apply a "line charge" to the home electricity usage that is based on the peak consumption in an electricity consumption cycle (e.g., every month), the electricity consumption cap for such a setting can be the maximum load allowed by the main circuit breaker of the home. When one or more electric vehicles are plugged in at the home for charging, the electronic device optionally charges the vehicles at the highest output powers possible without tripping the main circuit breaker. If the non-EV charging circuit load increases (e.g., an electric appliance is turned on), the electronic device quickly lowers the EV-charging power output, such that the overall output to the home falls below the maximum power allowed by the main circuit breaker and that the normal household use of electricity is not disrupted; and if the non-EV charging circuit load decreases (e.g., an electric appliance is turned off), the electronic device optionally increases the output power to the electric vehicles to increase the charging speed. In some embodiments, different EV charging outputs are selected based on the tiered rates that are applied to the home at different times during the day, thus, during the high rates period, the EV-charging power is not increased beyond a threshold power level, even if the total electricity load is below the maximum load allowed by the main circuit breaker of the home.

In some embodiments, detecting activation of the first electric vehicle charging connection in the second set of circuits includes receiving a first communication signal from a first on-board charging system of a first electric vehicle through the first electric vehicle charging connection, wherein the first communication signal (e.g., a digital message or data packet, a digital voltage or current signal, an encoded sequence of values, etc.) includes an identifier of the first on-board charging system. In some embodiments, each on-board charging system (e.g., the combined charging and traction system 1200 described herein) is given a unique identifier (e.g., a sequence of zeros and ones) that is used as a key to find an account or profile in a database that corresponds to the on-board charging system, its owner, its corresponding vehicle, and/or corresponding payment account, affiliation, schedule, route, etc. The electronic device receives this first communication signal via the direct power line connection between the on-board charging system of the first electric vehicle and the charging station. In some embodiments, the first communication signal can also be transmitted wirelessly from the first on-board charging system 1200 to the charging station 116, or to the electronic device 114, or to a server 604 that is in communication with the electronic device 114 and that forwards the first communication signal to the electronic device 114.

In some embodiments, dynamically adjusting the current output power of the first electric vehicle charging connection in accordance with the difference between the electricity consumption cap for the current electricity consumption cycle and the current load on the first set of circuits of the electricity demand center includes: detecting a change in the current load on the first set of circuits of the electricity demand center (e.g., by detecting a charging in the total load at the electricity demand center without detecting any change in the load on the second sets of circuits); and in accordance with a determination that the change in the current load on the first set of circuits meets charging adjustment criteria (e.g., the total load at the main input of the electricity demand center is changed relative to the electricity consumption cap by at least a threshold amount), the electronic device transmits a second communication signal (e.g., a digital message or data packet, a digital voltage or current signal, an encoded sequence of values, etc.) to the first on-board charging system 1200 of the first electric vehicle through the first electric vehicle charging connection, wherein the second communication signal specifies a respective charging power for the first on-board charging system, and wherein the first on-board charging system 1200 adjusts a current charging power of the first electric vehicle in accordance with the second communication signal. In some embodiments, the second communication signal can also be transmitted wirelessly from the electronic device 114 to the first on-board charging system 1200, or from a server 604 that is in communication with the electronic device 114 and that forwards the second communication signal to the on-board charging system 1200 of the electric vehicle 124. In some embodiments, the electronic device 114 broadcasts the instructions with corresponding identifiers of the on-board charging systems 1200 continuously wirelessly or via the active electric vehicle charging connections, and each electric vehicle's on-board charging system 1200 selects the instructions that corresponds to its own unique identifier and adjusts its charging power according to the instructions.

In some embodiments, the activation of the first electric vehicle charging connection is detected while one or more second electric vehicle charging connections in the second set of circuits are currently charging one or more second electric vehicles distinct from the first electric vehicle, and enforcing the output power cap for the second set of circuits includes: dynamically adjusting respective current output powers of the one or more second electric vehicle charging connections in accordance with the difference between the electricity consumption cap for the current electricity consumption cycle and the current load on the first set of circuits of the electricity demand center, and in accordance with the current output power of the first electric vehicle charging connection. For example, the different vehicles may have different charging priorities and needs, and the electronic device 114 coordinates the charging power allotted to the different vehicles based on their different charging priorities and needs as well as the electricity usage on the primary circuits and the electricity consumption cap set for the electricity demand center as a whole (e.g., as illustrated in FIG. 4). In some embodiments, enforcing the output power cap for the second set of circuits includes setting different output power caps for at least two electric vehicle charging connections among the one or more second electric vehicle charging connections and the first electric vehicle charging connection.

In some embodiments, an electronic device (e.g., charging facility management device 114) for controlling an electric vehicle charging station is coupled to a main input of an electricity demand center on an electric grid, the electricity demand center includes a first set of circuits configured to supply electricity to a first set of electrical devices and a second set of circuits configured to supply electricity to respective on-board charging systems of one or more electric vehicles, and the electronic device includes one or more processors and memory storing instructions, wherein the instructions, when executed by the one or more processors, cause the processors to perform the method 1000.

In some embodiments, an electronic device (e.g., charging facility management device 114) for controlling an electric vehicle charging station (e.g., charging station 116), is coupled to a main input (e.g., input main 102) of an electricity demand center on an electric grid (e.g., grid 104), the electricity demand center includes a first set of circuits (e.g., primary circuits 110) configured to supply electricity to a first set of electrical devices and a second set of circuits (e.g., secondary circuits 112) configured to supply electricity to respective on-board charging systems of one or more electric vehicles (e.g., vehicles 124), the electronic device is configured to communicate with the respective on-board charging systems (e.g., systems 1200) of the one or more electric vehicles to receive respective unique identifiers for the respective on-board charging systems of the one or more electric vehicles and provide respective charging instructions to the on-board charging systems of the one or more electric vehicles, and the electronic device includes: one or more load sensors (e.g., voltage and/or current sensors) for sensing real-time electricity load at the input main of the electricity demand center; and a charging control unit with one or more processors and memory storing instructions, wherein the instructions, when executed by the one or more processors, cause the processors to perform operations comprising: activating load monitoring for the electricity demand center on the electric grid; determining an electricity consumption cap for a current electricity consumption cycle at the electricity demand center; during the current electricity consumption cycle, detecting activation of a first electric vehicle charging connection in the second set of circuits; and in response to detecting activation of the first electric vehicle charging connection in the second set of circuits, enforcing an output power cap for the second set of circuits, including dynamically adjusting, via one or more first charging instructions sent from the charging control unit to the respective on-board charging system of the first electric vehicle, a current output power of the first electric vehicle charging connection in accordance with a difference between the electricity consumption cap for the current electricity consumption cycle and a current load on the first set of circuits of the electricity demand center. Other details of the electronic device are described in other parts of the present disclosure with respect to various embodiments and are not repeated here in the interest of brevity.

Figure 8:
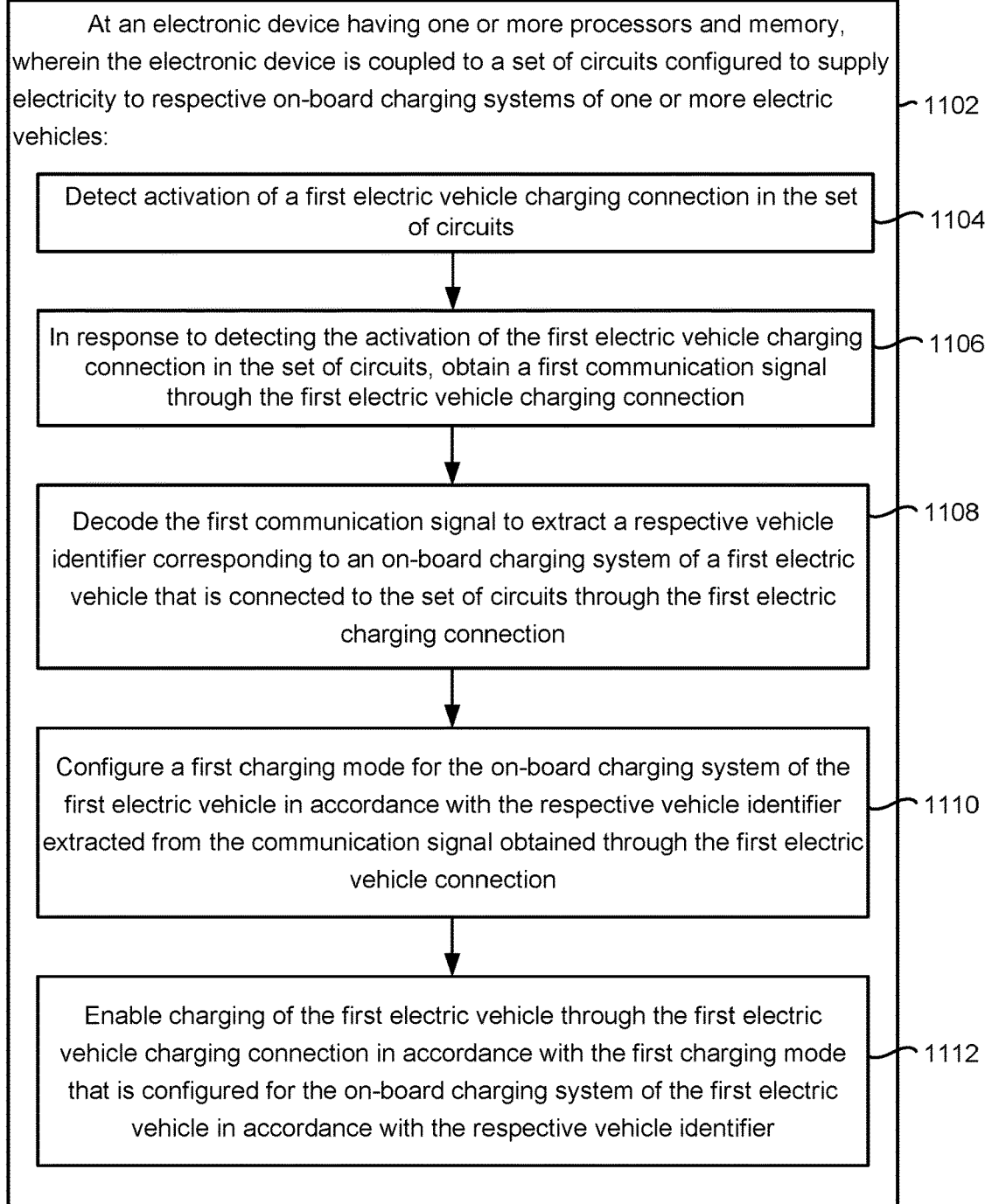
FIG. 8 is a flowchart of a method of controlling electric vehicle charging in accordance with some embodiments.

FIG. 8 is a flowchart of a method 1100 of controlling electric vehicle charging in accordance with some embodiments. The method is (1102) performed at an electronic device (e.g., charging facility management device 114, FIGS. 1, 6) having one or more processors and memory, wherein the electronic device is coupled to a set of circuits (e.g., secondary circuits 112) configured to supply electricity to respective on-board charging systems of one or more electric vehicles. The electronic device detects (1104) activation of a first electric vehicle charging connection in the set of circuits (e.g., secondary circuits 112). In response to detecting the activation of the first electric vehicle charging connection in the set of circuits, the electronic device obtains (1106) a first communication signal through the first electric vehicle charging connection (e.g., first communication signal is transmitted over the power line between the on-board charging system of the first electric vehicle and the charging station or the electronic device). The electronic device decodes (1108) the first communication signal to extract a respective vehicle identifier corresponding to an on-board charging system of a first electric vehicle that is connected to the set of circuits through the first electric charging connection. The electronic device configures (1110) a first charging mode for the on-board charging system of the first electric vehicle in accordance with the respective vehicle identifier extracted from the communication signal obtained through the first electric vehicle connection. The electronic device enables (1112) charging of the first electric vehicle through the first electric vehicle charging connection in accordance with the first charging mode that is configured for the on-board charging system of the first electric vehicle in accordance with the respective vehicle identifier.

In some embodiments, configuring the first charging mode for the on-board charging system of the first electric vehicle in accordance with the respective vehicle identifier extracted from the communication signal obtained through the first electric vehicle connection includes: in accordance with a determination that the respective vehicle identifier corresponds to a first type of on-board charging system (e.g., the combined charging and traction system described herein), the electronic device sets a charging output level for the first electric charging connection that is subject to subsequent adjustment by the electronic device in accordance with a current load on the set of circuits; and in accordance with a determination that the respective vehicle identifier corresponds to a second type of on-board charging system (e.g., a conventional on-board charging system that does not allow modification of the charging power levels, and only allows fixed charging power levels (or only allowing tapering off or trickle charging after the battery is almost fully charged)) that is distinct from the first type of on-board charging system, the electronic device sets the charging output level for the first electric charging connection that is not subject to subsequent adjustment by the electronic device in accordance with the current load on the set of circuits (e.g., charging at the default output charging power of the on-board charging system, such as 24 Amp, 12 Amp, 8 Amp, etc., without dynamically changing the charging power level based on actual external electricity usage situation at the electricity demand center).

In some embodiments, in response to obtaining the first communication signal through the first electric vehicle charging connection, the electronic device sends the respective vehicle identifier to a server, wherein the server identifies a user account associated with the respective vehicle identifier that corresponds to the on-board charging system of the first electric vehicle, and wherein the server requests, through a first communication channel between the server and a user device associated with the user account, a charging authorization from a user associated with the user account.

In some embodiments, prior to enabling charging of the first electric vehicle through the first electric vehicle charging connection, the electronic device receives the charging authorization from the server, wherein the server has received the charging authorization from the user associated with the user account through a second communication channel between the sever and the user device associated with the user account. For example, after the electronic device receives the identifier from the on-board charging system of the first electric vehicle, the electronic device sends the identifier to the server, where the server identifies the user account associated with the identifier from a database, and establishes direct communication with a user device associated with the user account without going through the electronic device. This way, the electronic device or the charging station does not need to be equipped with a human-machine user interface or specialized security mechanism to directly communicate with the user. Instead, the communication can be established between the server and the user device using the human-machine user interface of the user device and the security mechanism of the communication channel between the server and the user device. In some embodiments, if the server is able to identify the user account and the associated user device, the server can send an authorization request to the user device, and receive the authorization from the user via the direct communication channel between the server and the user device, and then sends the authorization to the electronic device, such that the electronic device can start the charging process upon receiving the authorization from the server. The advantage of using the server to facilitate the authorization process is that, the charging facility can be very simple and low cost, and the user does not need to directly interact with the charging station or the electronic device 114 physically (other than plugging in the on-board charging system to the EV-charging circuits) to get the charging started.

In some embodiments, prior to enabling charging of the first electric vehicle through the first electric vehicle charging connection, the electronic device receives the charging authorization from the user, wherein the charging authorization includes authentication information that has been provided to the user by the server through a second communication channel between the sever and the user device associated with the user account. For example, if the user is able to provide payment information to the server over the direct communication channel between the server and the user device associated with the identifier, and the server is able to verify the payment information, the server can provide an authorization code to the user device, and the user can enter the authorization code at the charging station. Once the electronic device receives the authorization code, the electronic device authorizes the on-board charging system to start charging. The authorization code is a passcode that does not include any payment information of the user, and thus, there is no need to implement special security mechanism at the charging station, since there is no exchange of private user information (e.g., payment information, password, etc.) at the charging station.

Figure 10:
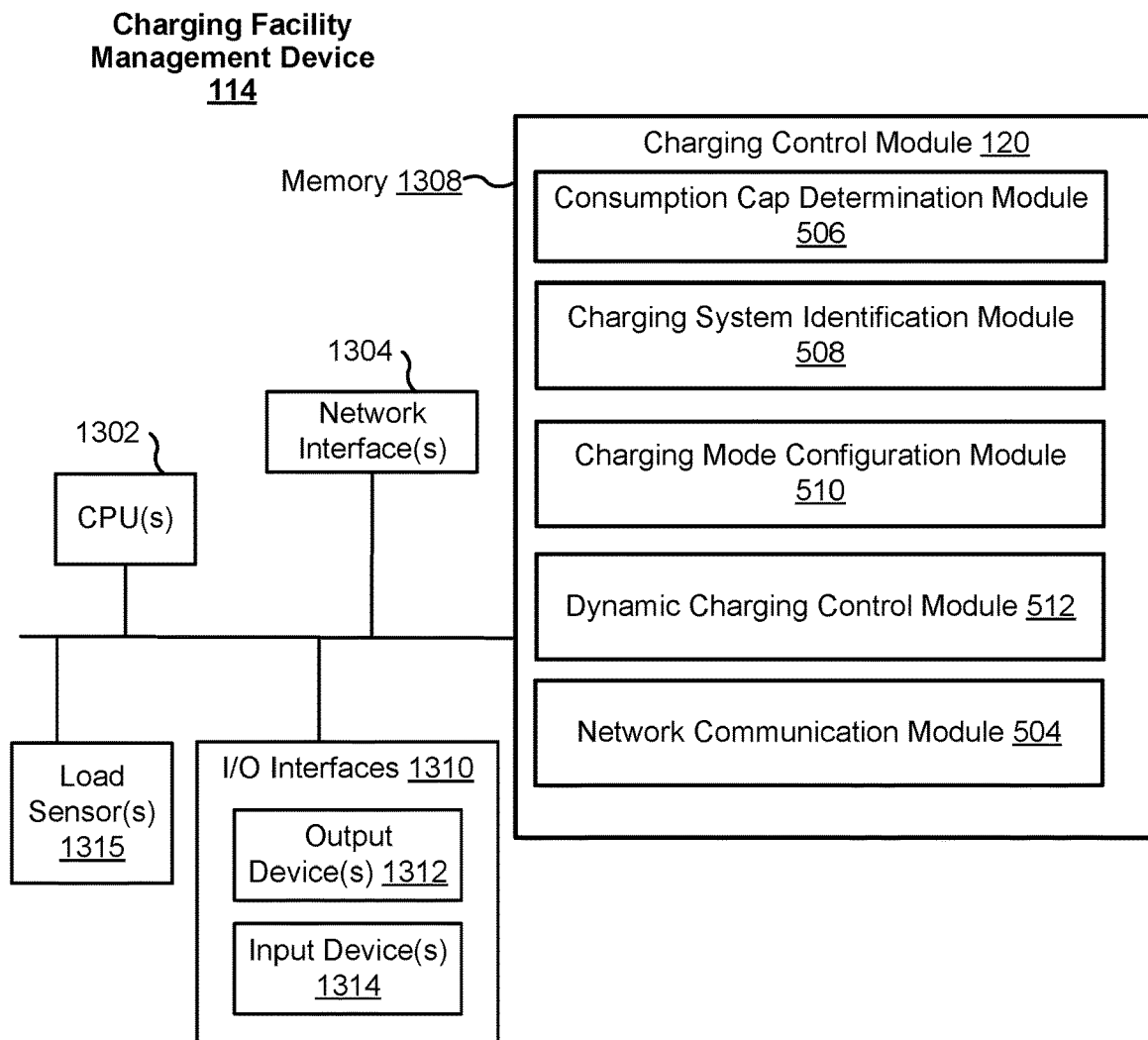
FIG. 10 is a block diagram illustrating example control circuitry in an electric vehicle charging facility management device in accordance with some embodiments.

In some embodiments, configuring the first charging mode for the on-board charging system of the first electric vehicle in accordance with the respective vehicle identifier extracted from the communication signal obtained through the first electric vehicle connection includes: determining a current electricity consumption cap for the set of circuits; and dynamically adjusting a current output power of the first electric vehicle charging connection in accordance with the current electricity consumption cap for the set of circuits and the current load on the set of circuits, e.g., as described with respect to method 1000 in FIG. 10.

In some embodiments, the electronic device receives a charging request in association with the respective vehicle identifier corresponding to the on-board charging system of the first electric vehicle, wherein the charging request specifies a maximum charging time and a minimum electricity amount for charging the first electric vehicle, and wherein configuring the first charging mode for the on-board charging system of the first electric vehicle in accordance with the respective vehicle identifier extracted from the communication signal obtained through the first electric vehicle connection includes setting a charging output level of the first electric vehicle connection in accordance with the maximum charge time and the minimum electricity amount specified in the charging request. In some embodiments, the first charging mode allows the charging output level to vary in accordance with one or more factors that are independent of a state of the on-board charging system of the first electric vehicle during the course of charging the first electric vehicle. For example, the one or more factors may include one or more of, or combinations of, the schedule of the first electric vehicle, the route of the first electric vehicle, the electricity load on the primary circuits of the electricity demand center, the charging power applied to other charging vehicles, the schedule, route, charging needs and requirements of other charging vehicles that are associated with the first electric vehicle, etc.

In some embodiments, an electronic device for controlling an electric vehicle charging station is coupled to a set of circuits configured to supply electricity to respective on-board charging systems of one or more electric vehicles, the electronic device includes one or more processors and memory storing instructions, the instructions, when executed by the one or more processors, cause the processors to perform operations described with respect to method 1100, and other operations described with various embodiments.

In some embodiments, an electronic device (e.g., charging facility management device 114) for controlling an electric vehicle charging station is coupled to a main input (e.g., input main 102) of an electricity demand center on an electric grid (e.g., grid 104), the electricity demand center includes a first set of circuits (e.g., primary circuits 110) configured to supply electricity to a first set of electrical devices and a second set of circuits (e.g., secondary circuits 112) configured to supply electricity to respective on-board charging systems of one or more electric vehicles, the electronic device is configured to communicate with the respective on-board charging systems of the one or more electric vehicles to receive respective unique identifiers (e.g., a unique serial number) for the respective on-board charging systems of the one or more electric vehicles and provide respective charging instructions to the on-board charging systems of the one or more electric vehicles, the electronic device is configured to communicate with a server (e.g., server 604) via a first communication channel (e.g., a communication channel that connects the server and a user device associated with the identifier without going through the electronic device 114 or charging stations 116), and the electronic device includes: one or more load sensors (e.g., 502) for sensing real-time electricity load at the input main (e.g., input main 102) of the electricity demand center; and a charging control unit with one or more processors and memory storing instructions, wherein the instructions, when executed by the one or more processors, cause the processors to perform operations comprising: detecting activation of a first electric vehicle charging connection in the second set of circuits (e.g., secondary circuits 112); in response to detecting the activation of the first electric vehicle charging connection in the second set of circuits, obtaining a first communication signal through the first electric vehicle charging connection; decoding the first communication signal to extract a respective vehicle identifier corresponding to an on-board charging system of a first electric vehicle that is connected to the second set of circuits through the first electric charging connection; configuring a first charging mode for the on-board charging system of the first electric vehicle in accordance with the respective vehicle identifier extracted from the communication signal obtained through the first electric vehicle connection; enabling charging of the first electric vehicle through the first electric vehicle charging connection in accordance with the first charging mode that is configured for the on-board charging system of the first electric vehicle in accordance with the respective vehicle identifier.

In some embodiments, the operations include: in response to obtaining the first communication signal through the first electric vehicle charging connection, sending the respective vehicle identifier to the server (e.g., server 604), wherein the server identifies a user account associated with the respective vehicle identifier that corresponds to the on-board charging system of the first electric vehicle, wherein the server requests, through a first communication channel between the server and a user device (e.g., user device 610) associated with the user account, a charging authorization from a user associated with the user account.

In some embodiments, the operations include: prior to enabling charging of the first electric vehicle through the first electric vehicle charging connection, receiving the charging authorization from the server (e.g., server 604), wherein the server has received the charging authorization from the user associated with the user account through a second communication channel between the sever and the user device (e.g., user device 610) associated with the user account.

In some embodiments, the operations include: prior to enabling charging of the first electric vehicle through the first electric vehicle charging connection, receiving the charging authorization from the user, wherein the charging authorization includes authentication information that has been provided to the user by the server through a second communication channel between the sever and the user device (e.g., user device 610) associated with the user account.

Other aspects of the electronic device are described herein with various embodiments, and are not repeated herein in the interest of brevity.

FIG. 9 is a block diagram illustrating example control circuitry in a combined charging and traction system 1200, in accordance with some embodiments. In some embodiments, system 1200 includes one or more processors 1202 (sometimes called CPUs, processing units, or hardware processors, and sometimes implemented using microprocessors, microcontrollers, or the like). In some embodiments, processor(s) 1202 control the operation of one or more components of the charging system, such as the first, second, third, and fourth switches, the inverter (e.g., the switching of the transistors of the inverter), and/or the converter (e.g., the switching of the transistors of the converter). In some embodiments, the system 1200 includes memory 1208 (e.g., electrically coupled to processor(s) 1202). In some embodiments, memory 1208 includes a non-transitory computer readable storage medium. In some embodiments, memory 1208 stores programs, modules, and data structures that provide instructions for implementing respective operations in the methods described earlier in various embodiments.

In some embodiments, system 1200 includes motor controller 1204 and/or motor controller 1206. In some embodiments, motor controller 1204 is coupled to and controls the operation of the first motor. In some embodiments, motor controller 1206 is coupled to and controls the operation of the second motor. In some embodiments, motor controller 1204 and/or motor controller 1206 are implemented using microprocessors, microcontrollers, or the like. In some embodiments, motor controller 1204 and motor controller 1206 are coupled to and communicate with processor(s) 1202. In some embodiments, motor controller 1204 and motor controller 1206 receive instructions transmitted from processor(s) 1202 (e.g., instructions for motor settings such as motor speeds, torque directions (e.g., positive or negative), and/or required power levels), and, in response, motor controller 1204 and motor controller 1206 control the first and second motors, respectively, according to the instructions from processor(s) 1202.

In some embodiments, system 1200 includes vehicle management unit (sometimes called VMU) 1210. In some embodiments, VMU 1210 (sometimes called an ECU or ECM) collects and analyzes information from system 1200 and/or the vehicle on which system 1200 is installed, and determines respective power settings (e.g., power levels) required for the charging and traction modes of operation. In some embodiments, VMU 1210 is coupled to and transmits information, such as instructions, to processor(s) 1202 (or to motor controllers 1204 and 1206 (e.g., via processor(s) 1202)) for motor settings such as motor speeds, torque directions (e.g., positive or negative), and/or required power or current levels.

FIG. 10 is a block diagram illustrating example control circuitry in an electric vehicle charging facility management device 114 in accordance with some embodiments.

In some embodiments, charging facility management device 114 (e.g., FIGS. 1, 6) includes one or more processors 1302 (sometimes called CPUs, processing units, or hardware processors, and sometimes implemented using microprocessors, microcontrollers, or the like). In some embodiments, processor(s) 1302 control the operation of one or more components of charging facility management device 114, such as load sensors 1315, network interfaces 1304, I/O interface 1310 (e.g., including output devices 1312 and input devices 1314), and charging control and communication modules (e.g., consumption cap determination module 506, charging system identification system 508, charging mode configuration module 510, dynamic charging control module 512, network communication module 504, etc.). In some embodiments, charging facility management device 114 includes memory 1308 (e.g., electrically coupled to processor(s) 1302). In some embodiments, memory 1308 includes a non-transitory computer readable storage medium. In some embodiments, memory 1308 stores programs, modules, and data structures that provide instructions for implementing respective operations in the methods described herein with reference to FIGS. 7 and 8 and various embodiments.

Figure 11:
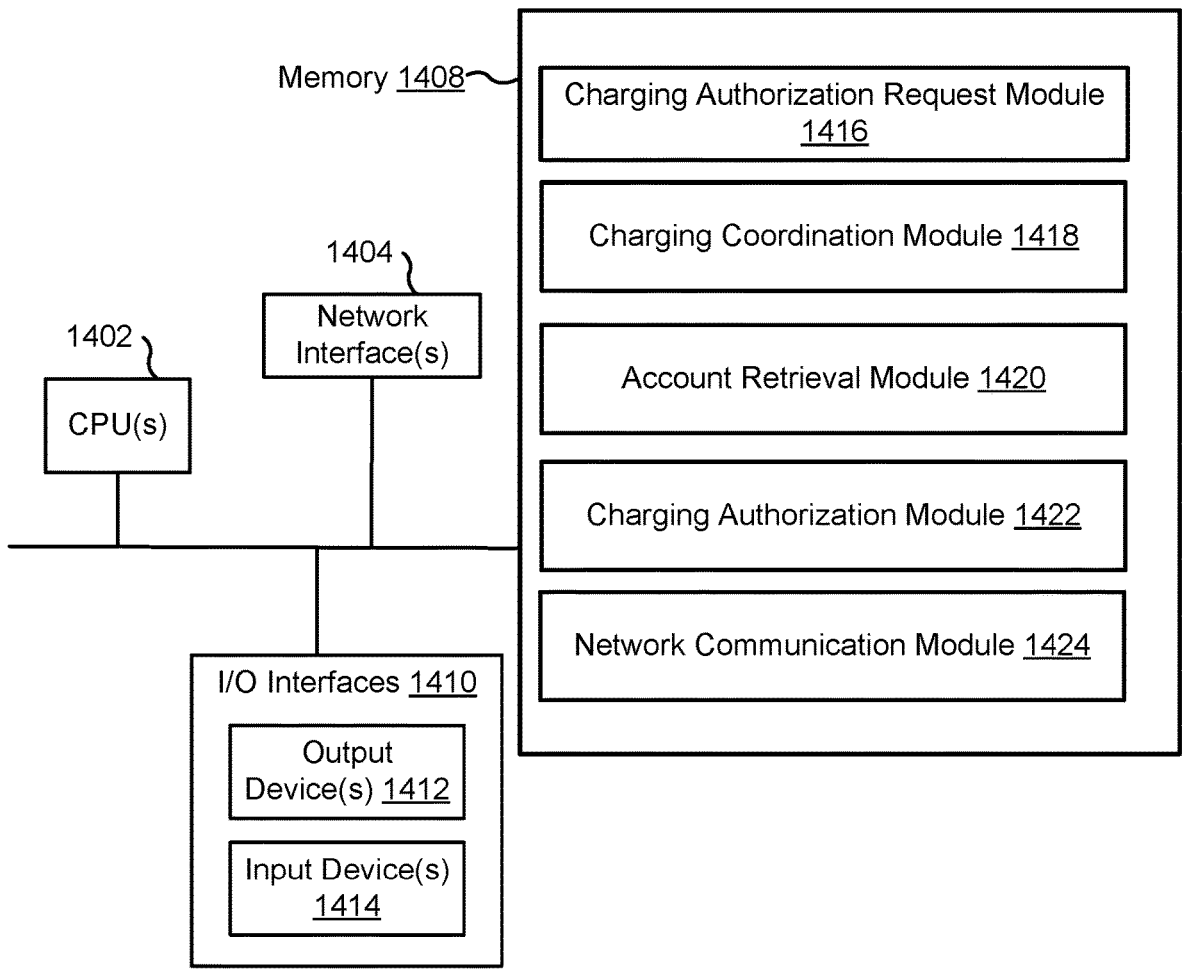
FIG. 11 is a block diagram illustrating example control circuitry in an electric vehicle charging facility server in accordance with some embodiments.

FIG. 11 is a block diagram illustrating example control circuitry in an electric vehicle charging facility management server 604 in accordance with some embodiments.

In some embodiments, charging facility management server 604 (e.g., FIG. 6) includes one or more processors 1402 (sometimes called CPUs, processing units, or hardware processors, and sometimes implemented using microprocessors, microcontrollers, or the like). In some embodiments, processor(s) 1402 control the operation of one or more components of charging facility management server 604, network interfaces 1404, I/O interface 1410 (e.g., including output devices 1412 and input devices 1414), and charging control and communication modules (e.g., charging authorization request module 1416 charging coordination module 1418, account retrieval module 1420, charging authorization module 1422, network communication module 14244, etc.). In some embodiments, charging facility management server 604 includes memory 1408 (e.g., electrically coupled to processor(s) 1402). In some embodiments, memory 1408 includes a non-transitory computer readable storage medium. In some embodiments, memory 1408 stores programs, modules, and data structures that provide instructions for implementing respective operations in the methods described herein with reference to FIGS. 7 and 8 and various embodiments.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of controlling an electric vehicle charging station, comprising:
   at an electronic device having one or more processors and memory, wherein the electronic device is coupled to a set of circuits configured to supply electricity to respective on-board charging systems of one or more electric vehicles:
      detecting activation of a first electric vehicle charging connection in the set of circuits;
      in accordance with detecting the activation of the first electric vehicle charging connection in the set of circuits, obtaining a first communication data that includes a respective vehicle identifier corresponding to an on-board charging system of a first electric vehicle that is connected to the set of circuits through the first electric charging connection;
      processing the first communication data to extract the respective vehicle identifier corresponding to the on-board charging system of the first electric vehicle that is connected to the set of circuits through the first electric charging connection;
      configuring a first charging mode for the on-board charging system of the first electric vehicle in accordance with the respective vehicle identifier including:
         in accordance with a determination that the respective vehicle identifier corresponds to a first type of on-board charging system that is configured to support dynamic adjustment of a charging output level during active charging via the first electric vehicle charging connection, setting a charging output level for the first electric charging connection that is subject to subsequent adjustment by the electronic device in accordance with a current load on the set of circuits; and
         in accordance with a determination that the respective vehicle identifier corresponds to a second type of on-board charging system that is distinct from the first type of on-board charging system and that does not support dynamic adjustment of the charging output level during active charging via the first electric vehicle charging connection, setting the charging output level for the first electric charging connection that is not subject to subsequent adjustment by the electronic device in accordance with the current load on the set of circuits; and
      enabling charging of the first electric vehicle through the first electric vehicle charging connection in accordance with the first charging mode that is configured for the on-board charging system of the first electric vehicle in accordance with the respective vehicle identifier.

2. The method of claim 1, including:
   in response to obtaining the first communication signal in accordance with detecting the activation of the first electric vehicle charging connection, sending the respective vehicle identifier to a server, wherein the server identifies a user account associated with the respective vehicle identifier that corresponds to the on-board charging system of the first electric vehicle, wherein the server requests, through a first communication channel between the server and a user device associated with the user account, a charging authorization from a user associated with the user account.

3. The method of claim 2, including:
   prior to enabling charging of the first electric vehicle through the first electric vehicle charging connection, receiving the charging authorization from the server, wherein the server has received the charging authorization from the user associated with the user account through a second communication channel between the sever and the user device associated with the user account.

4. The method of claim 2, including:
   prior to enabling charging of the first electric vehicle through the first electric vehicle charging connection, receiving the charging authorization from the user, wherein the charging authorization includes authentication information that has been provided to the user by the server through a second communication channel between the sever and the user device associated with the user account.

5. The method of claim 1, wherein configuring the first charging mode for the on-board charging system of the first electric vehicle in accordance with the respective vehicle identifier includes:
   determining a current electricity consumption cap for the set of circuits; and
   dynamically adjusting a current output power of the first electric vehicle charging connection in accordance with the current electricity consumption cap for the set of circuits and the current load on the set of circuits.

6. The method of claim 1, including:
   receiving a charging request in association with the respective vehicle identifier corresponding to the on-board charging system of the first electric vehicle, wherein the charging request specifies a maximum charging time and a minimum electricity amount for charging the first electric vehicle, wherein:
      configuring the first charging mode for the on-board charging system of the first electric vehicle in accordance with the respective vehicle identifier includes:
         setting a charging output level of the first electric vehicle connection in accordance with the maximum charge time and the minimum electricity amount specified in the charging request.

7. The method of claim 6, wherein the first charging mode allows the charging output level to vary in accordance with one or more factors that are independent of a state of the on-board charging system of the first electric vehicle during the course of charging the first electric vehicle.

8. An electronic device for controlling an electric vehicle charging station, wherein:
the electronic device is coupled to a set of circuits configured to supply electricity to respective on-board charging systems of one or more electric vehicles,
the electronic device includes one or more processors and memory storing instructions, the instructions, when executed by the one or more processors, cause the processors to perform operations comprising:
in accordance with detecting the activation of the first electric vehicle charging connection in the set of circuits, obtaining a first communication data that includes a respective vehicle identifier corresponding to an on-board charging system of a first electric vehicle that is connected to the set of circuits through the first electric charging connection;
processing the first communication data to extract the respective vehicle identifier corresponding to the on-board charging system of the first electric vehicle that is connected to the set of circuits through the first electric charging connection;
configuring a first charging mode for the on-board charging system of the first electric vehicle in accordance with the respective vehicle identifier including:
in accordance with a determination that the respective vehicle identifier corresponds to a first type of on-board charging system that is configured to support dynamic adjustment of a charging output level during active charging via the first electric vehicle charging connection, setting a charging output level for the first electric charging connection that is subject to subsequent adjustment by the electronic device in accordance with a current load on the set of circuits; and
in accordance with a determination that the respective vehicle identifier corresponds to a second type of on-board charging system that is distinct from the first type of on-board charging system and that does not support dynamic adjustment of the charging output level during active charging via the first electric vehicle charging connection, setting the charging output level for the first electric charging connection that is not subject to subsequent adjustment by the electronic device in accordance with the current load on the set of circuits; and
enabling charging of the first electric vehicle through the first electric vehicle charging connection in accordance with the first charging mode that is configured for the on-board charging system of the first electric vehicle in accordance with the respective vehicle identifier.

9. The electronic device of claim 8, wherein the operations include:
in response to obtaining the first communication signal in accordance with detecting the activation of the first electric vehicle charging connection, sending the respective vehicle identifier to a server, wherein the server identifies a user account associated with the respective vehicle identifier that corresponds to the on-board charging system of the first electric vehicle, wherein the server requests, through a first communication channel between the server and a user device associated with the user account, a charging authorization from a user associated with the user account.

10. The electronic device of claim 9, wherein the operations include:
prior to enabling charging of the first electric vehicle through the first electric vehicle charging connection, receiving the charging authorization from the server, wherein the server has received the charging authorization from the user associated with the user account through a second communication channel between the sever and the user device associated with the user account.

11. The electronic device of claim 9, wherein the operations include:
prior to enabling charging of the first electric vehicle through the first electric vehicle charging connection, receiving the charging authorization from the user, wherein the charging authorization includes authentication information that has been provided to the user by the server through a second communication channel between the sever and the user device associated with the user account.

12. The electronic device of claim 8, wherein configuring the first charging mode for the on-board charging system of the first electric vehicle in accordance with the respective vehicle identifier includes:
determining a current electricity consumption cap for the set of circuits; and
dynamically adjusting a current output power of the first electric vehicle charging connection in accordance with the current electricity consumption cap for the set of circuits and the current load on the set of circuits.

13. The electronic device of claim 8, wherein the operations include:
receiving a charging request in association with the respective vehicle identifier corresponding to the on-board charging system of the first electric vehicle, wherein the charging request specifies a maximum charging time and a minimum electricity amount for charging the first electric vehicle, wherein:
configuring the first charging mode for the on-board charging system of the first electric vehicle in accordance with the respective vehicle identifier includes:
setting a charging output level of the first electric vehicle connection in accordance with the maximum charge time and the minimum electricity amount specified in the charging request.

14. The electronic device of claim 13, wherein the first charging mode allows the charging output level to vary in accordance with one or more factors that are independent of a state of the on-board charging system of the first electric vehicle during the course of charging the first electric vehicle.

15. An electronic device for controlling an electric vehicle charging station, wherein:
the electronic device is coupled to a main input of an electricity demand center on an electric grid,
the electricity demand center includes a first set of circuits configured to supply electricity to a first set of electrical devices and a second set of circuits configured to supply electricity to respective on-board charging systems of one or more electric vehicles,
the electronic device is configured to communicate with the respective on-board charging systems of the one or more electric vehicles to receive respective unique identifiers for the respective on-board charging systems of the one or more electric vehicles and provide respective charging instructions to the on-board charging systems of the one or more electric vehicles, and
the electronic device is configured to communicate with a server via a first communication channel,
the electronic device includes:
one or more load sensors for sensing real-time electricity load at the input main of the electricity demand center; and
a charging control unit with one or more processors and memory storing instructions, wherein the instructions, when executed by the one or more processors, cause the processors to perform operations comprising:
in accordance with detecting the activation of the first electric vehicle charging connection in the set of circuits, obtaining a first communication data that includes a respective vehicle identifier corresponding to an on-board charging system of a first electric vehicle that is connected to the set of circuits through the first electric charging connection;
processing the first communication data to extract the respective vehicle identifier corresponding to the on-board charging system of the first electric vehicle that is connected to the set of circuits through the first electric charging connection;
configuring a first charging mode for the on-board charging system of the first electric vehicle in accordance with the respective vehicle identifier including:
in accordance with a determination that the respective vehicle identifier corresponds to a first type of on-board charging system that is configured to support dynamic adjustment of a charging output level during active charging via the first electric vehicle charging connection, setting a charging output level for the first electric charging connection that is subject to subsequent adjustment by the electronic device in accordance with a current load on the set of circuits; and
in accordance with a determination that the respective vehicle identifier corresponds to a second type of on-board charging system that is distinct from the first type of on-board charging system and that does not support dynamic adjustment of the charging output level during active charging via the first electric vehicle charging connection, setting the charging output level for the first electric charging connection that is not subject to subsequent adjustment by the electronic device in accordance with the current load on the set of circuits; and
enabling charging of the first electric vehicle through the first electric vehicle charging connection in accordance with the first charging mode that is configured for the on-board charging system of the first electric vehicle in accordance with the respective vehicle identifier.

16. The electronic device of claim 15, wherein the operations include:
in response to obtaining the first communication signal in accordance with detecting the activation of the first electric vehicle charging connection, sending the respective vehicle identifier to a server, wherein the server identifies a user account associated with the respective vehicle identifier that corresponds to the on-board charging system of the first electric vehicle, wherein the server requests, through a first communication channel between the server and a user device associated with the user account, a charging authorization from a user associated with the user account.

17. The electronic device of claim 15, wherein the operations include:
prior to enabling charging of the first electric vehicle through the first electric vehicle charging connection, receiving the charging authorization from the user, wherein the charging authorization includes authentication information that has been provided to the user by the server through a second communication channel between the sever and the user device associated with the user account.

* * * * *